(12) United States Patent
Wigand et al.

(10) Patent No.: US 7,993,123 B2
(45) Date of Patent: Aug. 9, 2011

(54) METHOD AND APPARATUS FOR FABRICATING THREE DIMENSIONAL MODELS

(75) Inventors: John Theodore Wigand, Merrimack, NH (US); Calvin McCoy Winey, III, Peterborough, NH (US); Michael Varanka, Amherst, NH (US)

(73) Assignee: Solidscape, Inc., Merrimack, NH (US)

( * ) Notice: Subject to any disclaimer, the term of this patent is extended or adjusted under 35 U.S.C. 154(b) by 13 days.

(21) Appl. No.: 12/483,504

(22) Filed: Jun. 12, 2009

(65) Prior Publication Data
US 2009/0252821 A1 Oct. 8, 2009

Related U.S. Application Data

(62) Division of application No. 11/445,516, filed on Jun. 2, 2006, now Pat. No. 7,700,016.

(60) Provisional application No. 60/705,138, filed on Aug. 3, 2005, provisional application No. 60/704,855, filed on Aug. 2, 2005, provisional application No. 60/704,854, filed on Aug. 2, 2005.

(51) Int. Cl.
*B29C 69/02* (2006.01)
*B29C 41/08* (2006.01)
*B29C 41/52* (2006.01)

(52) U.S. Cl. ........ 425/144; 425/145; 425/150; 425/176; 425/404; 425/DIG. 50

(58) Field of Classification Search .................. 425/144, 425/145, 150, 175, 176, 324.1, 375, 404, 425/DIG. 50; 239/290, DIG. 7
See application file for complete search history.

(56) References Cited

U.S. PATENT DOCUMENTS

| | | | | |
|---|---|---|---|---|
| 3,401,883 | A * | 9/1968 | Gebhardt et al. | 239/690 |
| 4,097,366 | A * | 6/1978 | Tanaka et al. | 208/127 |
| 4,247,508 | A | 1/1981 | Housholder | |
| 5,136,515 | A | 8/1992 | Helinski | |
| 5,172,443 | A * | 12/1992 | Christ | 8/149.1 |
| 5,184,776 | A * | 2/1993 | Minier | 239/417 |
| 5,188,290 | A * | 2/1993 | Gebauer et al. | 239/3 |
| 5,260,009 | A | 11/1993 | Penn | |
| 5,506,607 | A | 4/1996 | Sanders, Jr. et al. | |
| 5,540,385 | A * | 7/1996 | Garlick | 239/290 |
| 5,676,904 | A | 10/1997 | Almquist et al. | |
| 5,740,051 | A | 4/1998 | Sanders, Jr. et al. | |
| 6,012,647 | A * | 1/2000 | Ruta et al. | 239/132.1 |
| 6,175,422 | B1 | 1/2001 | Penn et al. | |
| 6,193,922 | B1 | 2/2001 | Ederer | |
| 6,193,923 | B1 | 2/2001 | Leyden et al. | |
| 6,325,063 | B1 * | 12/2001 | Volgyesi | 128/204.13 |
| 6,612,824 | B2 * | 9/2003 | Tochimoto et al. | 425/130 |
| 7,236,166 | B2 | 6/2007 | Zinniel et al. | |
| 7,502,023 | B2 | 3/2009 | Zinniel et al. | |
| 2002/0092918 | A1* | 7/2002 | Anderson et al. | 239/8 |
| 2002/0125426 | A1* | 9/2002 | Hirabayashi et al. | 250/288 |
| 2004/0175451 | A1* | 9/2004 | Maekawa et al. | 425/144 |

* cited by examiner

*Primary Examiner* — Joseph Del Sole
*Assistant Examiner* — Ryan Ochylski
(74) *Attorney, Agent, or Firm* — Davis & Bujold, P.L.L.C.

(57) ABSTRACT

An apparatus and method for fabricating a three dimensional model from a composite model formed or a plurality of successive layers of model material and sacrificial mold material. Each successive layer is constructed by depositing, drop-by-drop, at least one line of sacrificial mold material delineating at least one boundary of the model material within the layer and thereafter depositing the model material onto all delineated regions of the layer by spray deposition. Each successive layer is completed by a planing process which removes the undesired thickness of both the sacrificial and the model materials. Following completion of the composite model, the sacrificial mold material is removable from the composite model, by a process effecting only the sacrificial mold material, to produce the three dimensional model. A device, for depositing the model material at the rate faster than the rate that the mold material is deposited, is also described.

19 Claims, 15 Drawing Sheets

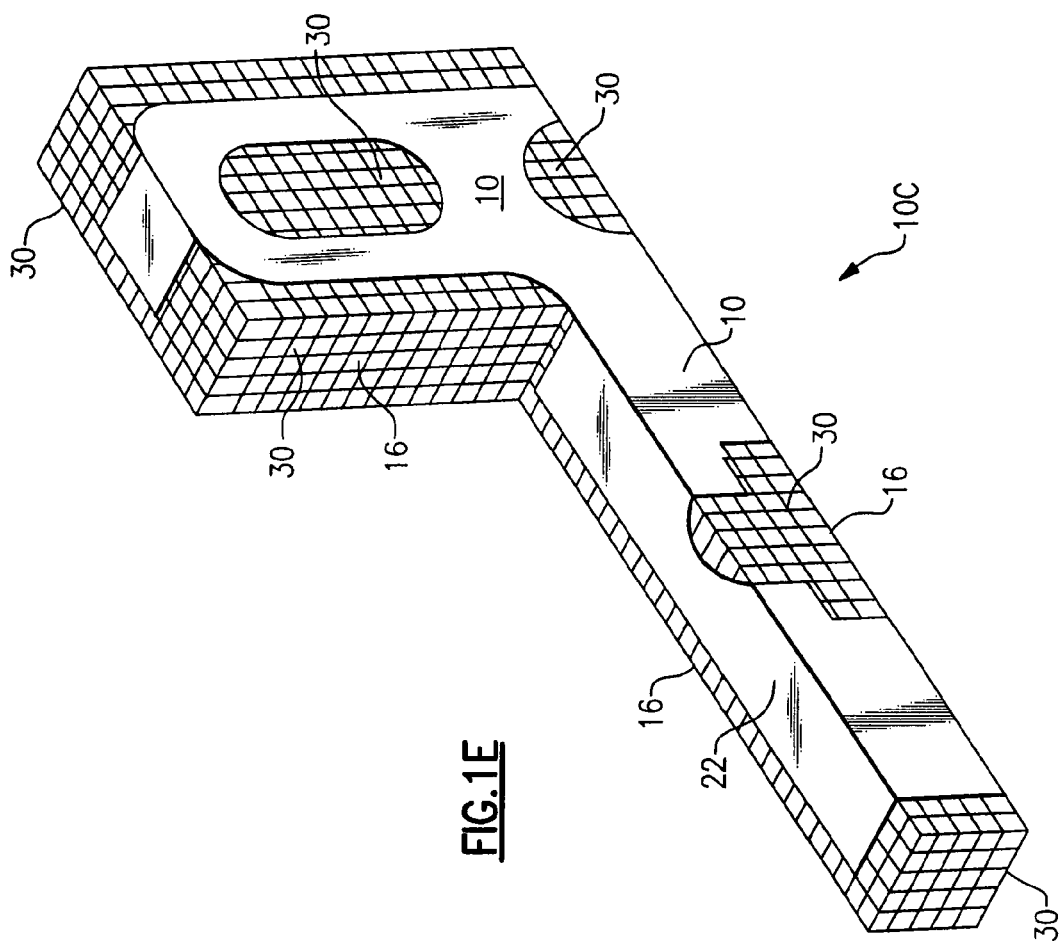

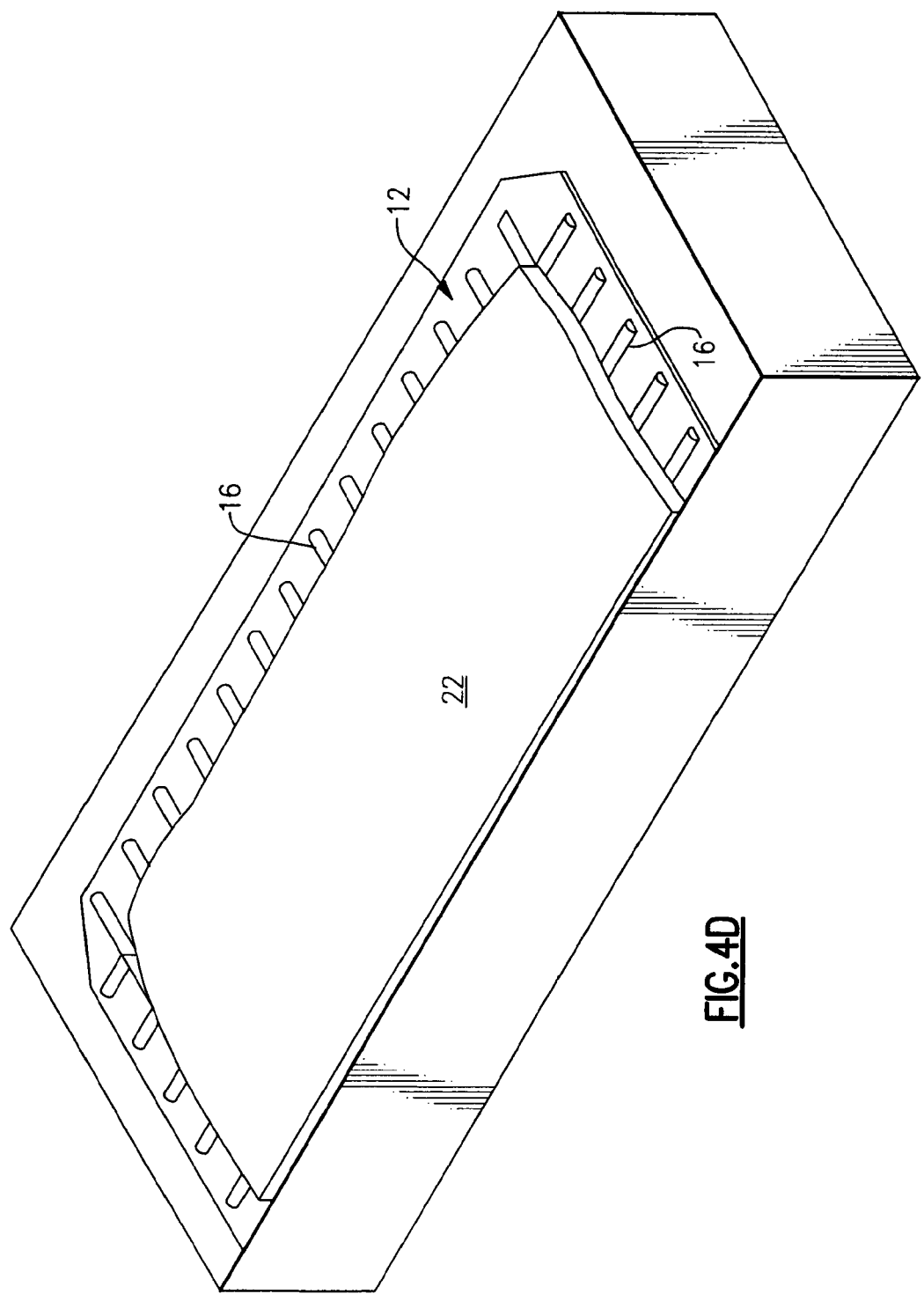

METHOD AND APPARATUS FOR FABRICATING THREE DIMENSIONAL MODELS

CROSS REFERENCES TO RELATED APPLICATIONS

The present patent application is related to and claims benefit of Provisional Patent Application Ser. No. 60/705,138 filed Aug. 3, 2005 by John Theodore Wigand, Calvin McCoy Winey III and Michael Varanka for a SPRAY JET DEVICE FOR FABRICATING THREE DIMENSIONAL MODELS, Provisional Patent Application Ser. No. 60/704,854 filed Aug. 2, 2005 by John Theodore Wigand for a METHOD FOR FABRICATING THREE DIMENSIONAL MODELS, Provisional Patent Application Ser. No. 60/704,855 filed Aug. 2, 2005 by John Theodore Wigand and Calvin McCoy Winey III for a DEVICE FOR FABRICATING THREE DIMENSIONAL MODELS, all of which are assigned to the assignee of the present patent application.

FIELD OF THE INVENTION

The present invention relates to a method and apparatus for fabricating three dimensional models and, more specifically, by fabrication of three dimensional models by deposition of successive layers comprised of a model material and a sacrificial mold material wherein in each layer the sacrificial mold material is first deposited by a drop-on-demand dispensing head and the model material is then deposited by a high deposition rate device such as a spray head.

BACKGROUND OF THE INVENTION

Contemporary design processes often require the rapid fabrication of prototypes and models of complex mechanical parts in low volumes and with minimum setup and fabrication times to allow the evaluation and testing of the design of such parts within very short design and development periods. Most conventional fabrication methods, however, are unsuitable for such purposes. Manual machining, for example, is sometimes suitable for relatively simple designs but is too slow and expensive for complex designs and Computer Numerically Controlled (CNC) machine processes, while suitable for complex designs, have significant limitations as regards the types or configurations of parts that can be fabricated.

The need for rapid, low cost, low volume fabrication of complex parts has generally been met by the development of various three dimensional (3D) modeling processes that employ layer by layer "printing" processes. In typical 3D modeling processes of the prior art, a part is built up by the successive deposition of layers comprised of a "model" material forming the actual part and a sacrificial material that provides support for the model material during the process, with the sacrificial material being subsequently removed to leave the model material forming the actual part.

Typical examples of 3D modeling processes of the prior art include, for example, Householder, U.S. Pat. No. 4,247,508, which describes a modeling process that employs two substances, one a fill material and the other a mold material, that are deposited layer by layer to build an article. The two materials in each layer are not in contact with each other while the layer is being formed because Householder '508 uses a grid to separate the two materials as they are being deposited. After the materials in each layer are deposited, the grid is moved to the next layer so that the two materials may fill the space left by the removed grid and thereafter solidify in contact with each other in the same layer.

Helinski, U.S. Pat. No. 5,136,515, describes a method wherein a three dimensional model is produced layer by layer by jetting droplets of at least two solidifiable materials, one material forming the article and a second material forming a support for the article. The second material is subsequently removed by heating, cutting, melting, chemical reacting, and so on, to leave the desired article.

Penn, U.S. Pat. No. 5,260,009, describes a system and process for making three dimensional objects by dispensing layer upon layer of modeling material using an inkjet which is turned "on" or "off" according to a two dimensional data map of each layer of the object. The two dimensional data map is stored and relayed by a microprocessor and defines locations on a matrix at which printing is to occur in a manner such as is used in printing images using raster scan printing.

Sanders, Jr. et al., U.S. Pat. No. 5,506,607, describes a system for building three dimensional models by vector plotting layer-upon-layer applications of solidifiable substances. The layers are formed by expelling minuscule beads of the substances in a liquid or flowable phase onto a platform from one or more jets wherein the jets and platform are relatively movable in the X, Y and Z coordinate system and the beads are deposited along vectors during X-Y relative movement.

Sanders, Jr. et al., U.S. Pat. No. 5,740,051, describes a method and apparatus for producing a 3-D model by forming a continuous plurality of parallel layers of modeling material by repeatedly producing a plurality of bead producing drops of the modeling material for deposition at desired locations, controlling the locations and timing of deposition to produce vectors in any and all directions required to produce an outer surface defining a wall of a layer with a desired surface finish, and adjusting the distance of the location of drop production to the location of drop deposition in preparation for the formation of a subsequent layer.

Penn et al., U.S. Pat. No. 6,175,422, describes a method and process for computer-controlled manufacture of three dimensional objects by dispensing a layer of a first insoluble material, such as a liquid, onto a platform at predetermined locations corresponding to a cross-section of the object, which then hardens. A second material, preferably water soluble, is then sprayed onto this layer to thereby encapsulate the hardened insoluble material. The uppermost surface of this encapsulant is planed, thus removing a portion of the encapsulant to expose the underlying insoluble material for a new pattern deposition. After the resulting planing residue is removed, another layer of liquid, insoluble material is dispensed onto the planed surface. The insoluble material can be of any color and may vary from layer to layer, and from location within a layer to location with a layer. These steps are repeated, until the desired three dimensional object, encapsulated in the soluble material, is completed. At this point, the object is either heated or immersed in solvent, thereby dissolving the soluble material and leaving the three dimensional object intact.

In typical embodiments of the 3D modeling processes, therefore, examples of which have been described above, the modeling and sacrificial materials are comprised of two materials having differing mechanical and/or chemical characteristics with the differences between the modeling and sacrificial materials being such that the sacrificial material can be selectively removed after the fabrication is completed. For example, in some implementations the sacrificial material may have a lower melting temperature than the modeling material or may be dissolvable by a solvent that does not effect the modeling material. Less common implementations of 3D modeling processes, which are not pertinent to the present invention, may construct the part and its model sacrificial regions from a single material having two different physical states or phases, depending, for example, upon whether a given region has been radiated by a specific type of laser radiation or has been treated with a binding agent or solvent, thereby converting treated and untreated regions of the material into the equivalent of modeling and sacrificial material.

The layers are typically laid down one layer at a time and one region or line of material at a time by drop-by-drop deposition of the materials on a previous layer or base by corresponding drop-on-demand print heads generally similar to those used in ink jet printers. Each layer is then planed to a level, uniform surface upon which the next layer may be deposited.

A system using two materials, that is, a model material and a sacrificial material, will thereby require two drop-on-demand print heads, the position and motion of each head which must be controlled according to the intended point of deposit of each drop of material. It must also be noted that each drop of sacrificial or model material is ejected from the corresponding drop-on-demand print head in a molten or liquid or semi-liquid state and solidifies only after it is deposited as part of the layer presently being laid down. This process is fundamental to the operation of drop-on-demand type print heads and additionally allows each drop to deform and to adhere to the previously deposited and solidified drops, including those of the previously deposited layer, before hardening.

The depositing of the drops of sacrificial or model material in a liquid or semi-liquid state, however, requires that each drop be deposited onto a supporting surface, typically the previously deposited layer. This, in turn, requires that each layer extend at least the maximum horizontal extent of the part above that layer, including those areas of a layer that lie under any overhanging or undercut regions of a part, although such temporary supporting areas of the layers may be subsequently removed when the modeling process is completed.

It will therefore be apparent that the 3D modeling systems of the prior art suffer from a number of inherent disadvantages. For example, the necessity that each layer must be fully supported by a lower layer requires that each layer provide a platform or support for the entire maximum horizontal model and support dimensions of the layer above it. In a typical part, however, much of the deposited material is thereby merely sacrificial material that must be subsequently removed, so that much of the deposited material is effectively "waste". In addition, the depositing of the model and sacrificial material on a drop-by-drop basis is very time consuming, particularly when a significant proportion of the material is subsequently sacrificed, or wasted, in order to obtain the final part.

In addition, drop-by-drop deposition requires the use of print heads having relatively small jetting orifices, which limit the rate at which material can be deposited, limit the types of material that can be deposited to those materials capable of being ejected as drops through a small orifice, and reduce the print head reliability because the small orifices are more readily subject to blockage.

In addition, a typical 3D modeling process according to the prior art will lay down a layer by first depositing the model material, that is, constructing a one layer thick section of the part itself, and then filling in the remainder of the layer area with the sacrificial support material, so that the sacrificial support material functions only as a support for the next layer. This sequence of deposition, however, means that the dimensions, the texture and the quality of the finished part is determined solely by the qualities and the characteristics of the model material which are, in turn, largely determined by the characteristics required to form an initially free-standing structural element. The result, however, is to limit the characteristics of the model material in a way that is determined more by the modeling process than by the desired final characteristics of the finished part, so that the desired material and finish characteristics of the finished part often cannot be satisfactorily achieved.

The present invention addresses these and other related problems of the prior art.

SUMMARY OF THE INVENTION

The present invention is directed to a method and apparatus for fabricating three dimensional models and, more specifically, by fabrication of three dimensional models by deposition of successive layers comprising a model material and a sacrificial mold material wherein in each layer the sacrificial mold material is first deposited by a drop-on-demand dispensing head and the model material is then deposited by a high deposition rate device, such as a spray head, thereby forming a composite model formed of sacrificial mold material and model material. The sacrificial mold material is then removed from the composite model by a process effecting only the sacrificial mold material, leaving the final model formed of model material.

The depositing of sacrificial mold material and model material on a layer of the model will typically comprise the steps, for each layer, of depositing a line or lines of the sacrificial mold material delineating a boundary or boundaries of the model material within the layer via a drop-by-drop deposition of the sacrificial mold material, wherein the sacrificial mold material boundary or boundaries will typically enclose each area of the layer to be filled with the model material, and depositing the model material onto all regions of the layer by a deposition rate process, such as spray deposition. The spray deposition of model material concurrently deposits a relatively large number of model material drops over an area of the layer rather than rapidly depositing single droplets at one point at a time and will thereby result in a significantly higher rate of deposition of the model material compared to the sacrificial mold material. The method of the present invention may further include the step of removing a portion of the deposited layer or surface of the sacrificial mold material and model material to reduce the layer to a selected thickness of the sacrificial mold material and the model material. The upper surfaces of the sacrificial mold material and the model material will thereby be exposed in the areas respectively occupied by the sacrificial mold material and the model material in preparation for the deposition of the next layer.

The method may also include steps for filling void regions and support regions of the three dimensional model on a layer by layer basis by creating one or more filler elements bounded by sacrificial mold material and filled by model material. In this process, and in each layer having a region that is included in a void or that forms a support for a subsequent layer, the drop-on-demand device deposits lines of sacrificial mold material in a desired pattern that will form a grid of boundary lines delineating and occupying the region of the layer included in the void or support area. It must be understood, however, that the "grid" need not be of rectilinear form, but may have any pattern or shape necessary or desirable to define the area comprising a void or support area within a layer or a number of layers, including patterns having irregular, curved or angled features or elements. The grid patterns, included in a void or support area in successive layers, form partitions of sacrificial mold material that delineate spaces in each layer for receiving the model material thereby filling the void or support areas of successive layers with filler elements of model material separated by the sacrificial mold material. Subsequent removal of the sacrificial mold material partitions will then free and remove the filler elements from the model.

In a further aspect of the present invention, the high deposition rate model material deposition device may include a separate delivery and temperature control for controlling the model material and a propellant for propelling the model material.

BRIEF DESCRIPTION OF THE DRAWINGS

The invention will now be described, by way of example, with reference to the accompanying drawings in which:

FIGS. 1A-1E illustrate an exemplary model to be fabricated by the method and apparatus of the present invention with FIG. 1A being a perspective view of a completed 3D model, FIGS. 1B, 1C and 1D are sectional views along the indicated section lines of FIG. 1A, and FIG. 1E is a sectional view along section line of 1E-1E of FIG. 1A prior to removal of the sacrificial mold material;

FIGS. 4A-4E are summary illustrations of a process for fabricating a composite model;

DETAILED DESCRIPTION OF THE PREFERRED EMBODIMENTS

The present invention is directed to a method and apparatus for fabricating three dimensional models of, for example, computer generated (e.g., CAD) structures or parts, using a layer-by-layer approach that provides a significant improvement with respect to model dimensional accuracy and surface finish and the time required for fabrication of such parts or structures. The method and apparatus of the present invention also allow a model to be fabricated from an increased range of materials, including materials that can not be delivered via drop-on-demand (DOD) deposition devices.

A. Model Fabrication Process

Figure 1A:
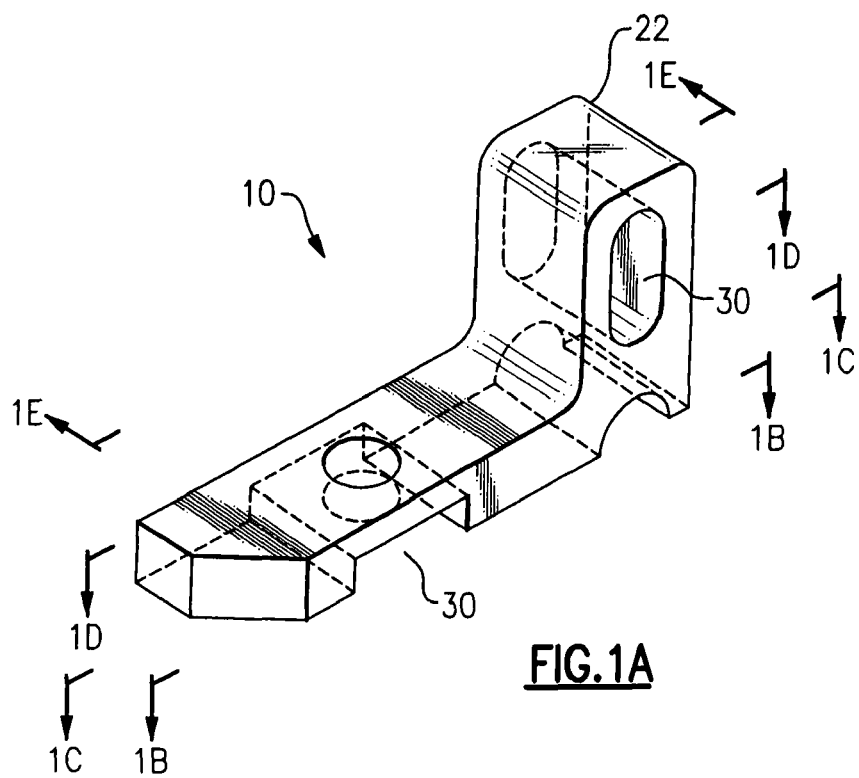
Figure 1B:
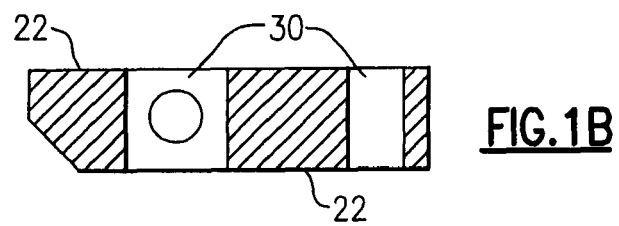
Figure 1C:
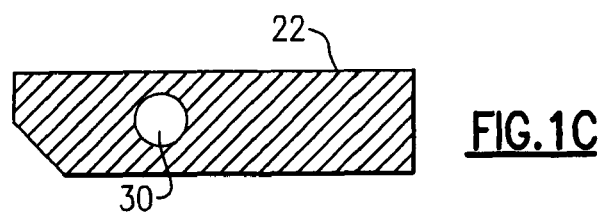
Figure 1D:
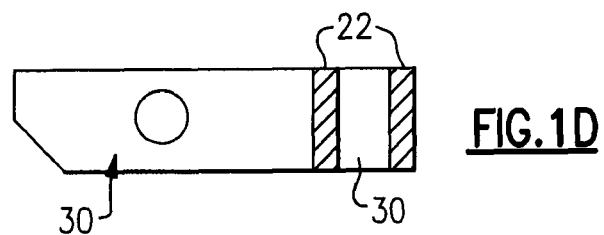

FIGS. 1A through 1E illustrate an exemplary finished model 10 (FIG. 1A) to be fabricated according to the method and the apparatus of the present invention and will be referred to in the following discussion. As represented in FIG. 1E, and for purposes of the following description, the apparatus and method of the present invention fabricates a finished model 10 (FIG. 1A) by constructing a composite model 10C (FIG. 1E) comprised of the finished model 10 formed of model material and a sacrificial mold formed of sacrificial mold material 16, and by subsequently removing the sacrificial mold material 16 from the composite model 10C to leave the finished model 10 (FIG. 1A).

Figure 2A:
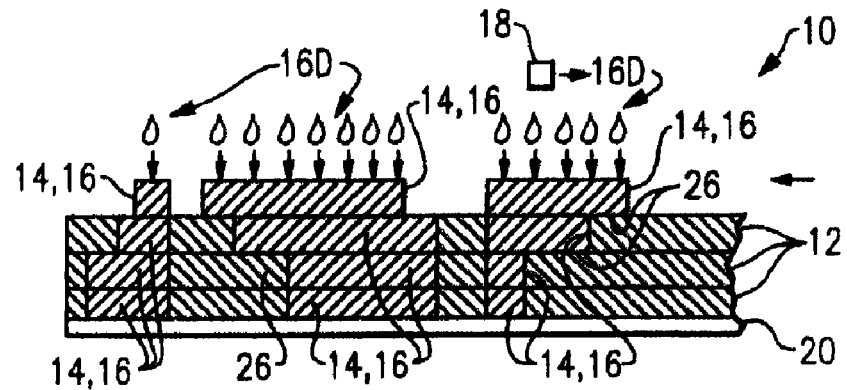
FIGS. 2A-2C illustrate the method of the present invention for fabricating successive layers of sacrificial material and model material by drop-on-demand and spray deposition of the materials.
Figure 2B:
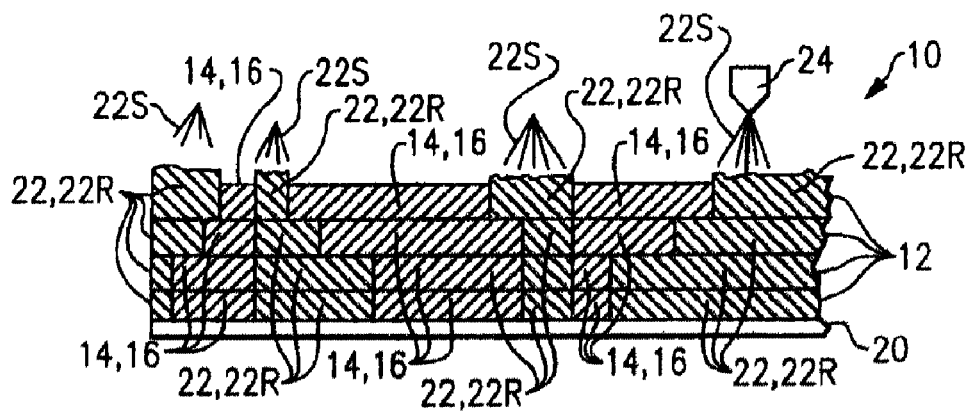
Figure 2C:
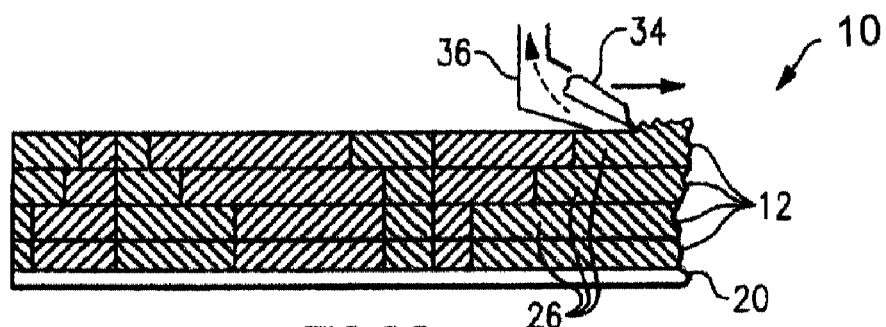

According to the present invention and as illustrated in FIGS. 2A, 2B and 2C, the composite model 10C is comprised of a plurality of layers 12 wherein, as represented in FIG. 2A, each layer 12 is formed by first depositing boundaries formed of lines or areas 14 comprised of one or more sacrificial mold materials 16 that define the surfaces of the finished model 10. As indicated, the sacrificial mold material 16 is deposited as drops 16D on a drop-by-drop basis by a drop-on-demand device 18. As also indicated, the first layer 12 may be deposited on a base 20 that may be comprised of any material suitable to accept the deposition of the sacrificial mold material and the model material, and thereafter each succeeding layer 12 will be deposited on the preceding layer 12.

As shown in FIG. 2B, one or more model materials 22 are then deposited on the layer 12, including both the boundaries of sacrificial mold material 16 and the regions 22R of the model defined by the sacrificial mold material 16 to receive and be filled by the model material 22 and to thereby comprise the actual finished model or part 10, after the sacrificial mold material 16 is removed. In contrast from the sacrificial mold material 16, however, the model material 22 is deposited by a high deposition rate device 24 at a faster rate than is achievable by the drop-on-demand device depositing the sacrificial mold material 16. The model material 22 is, for example, deposited as a spray 22S, that is, as a mist of droplets from the spray device 24.

After the model material 22 is deposited, any sacrificial mold material 16 and any model material 22 that exceeds the specified layer thickness are removed, such as by a planing operation, as illustrated in FIG. 2C, and the next layer 12 is then deposited upon the previous layer 12. This process is repeated until the last layer 12 is deposited and any excess material 16, 22 of that layer 12 is removed.

As described above, therefore, the method and apparatus of the present invention first deposits the sacrificial mold material 16 to define the boundary or boundaries of the model material 22, thereby forming a mold defining the exterior surfaces of the model material, and then deposits the model material 22 within the boundary or boundaries defined by the sacrificial mold material 16, which differs from the prior art wherein the model material is deposited first and the sacrificial support material is used exclusively as a place holder to provide support for the next layer 12 in regions of the current layer 12 where no model material is required or deposited. In addition, and as also described above, while the sacrificial mold material 16 is deposited on a drop-by-drop basis, the model material 22 is deposited at a higher deposition rate such as a spray, which differs from the systems and methods of the prior art.

Considering certain aspects of the operation of the method and apparatus of the present invention in further detail, the fabrication of a given layer 12 of a composite model 10C will typically begin with a vector plot of the locations on the X-Y plane, that is, the horizontal plane, that are to receive the sacrificial mold material 16 and that are thereby to define the outer perimeters, molds, locations, boundaries, boarders, and/or surfaces of the model formed of the model material 22. The vector plot guides the drop-by-drop depositing of sacrificial mold material 16, in liquid drop 16D form, at precise locations along the X-Y coordinate plane, that is, in the horizontal plane, by a drop-on-demand device 18, similar to an ink jet print head, wherein the drops 16D solidify or cure upon or shortly after landing at the specified locations to thereby define the boundary or boundaries of the model material 22 on each layer 12, and thereby the surfaces of the model material 22 forming the finished model.

In this regard, it must be noted that in the system of the present invention, the drop-on-demand device 18 can move in the X-Y plane along a variable path and often at a variable speed while expelling the drops 16D of sacrificial mold material 16, and that motion of the drop-on-demand device 18 can occur along either axis independently or both axes simultaneously. The direction and rate of motion along each axis determines the angle of the vector by which each drop 16D of sacrificial mold material 16 is deposited, and the velocity of the device's motion and the frequency of the drop 16D ejection from drop-on-demand device 18 determine the density and continuity or smoothness of the sacrificial mold material 16 deposited, and ultimately the characteristics of the model material 22 surface. It should also be recognized that dynamic modification of the respective X and/or Y endpoints of the drop-on-demand device 18 vector path, prior to the completion of a vector, permits a continuous transition of the points of deposition from one vector to a subsequent vector and thereby, for example, the deposition of sacrificial mold material 16 along curved and angled lines.

The precise drop-by-drop deposition of the sacrificial mold material 16 thereby allows the system to achieve a high degree of precision in defining the boundary or boundaries of the surfaces of the part or finished model 10 and the "finish" or surface characteristics of the subsequently deposited model material 22. It must also be noted that the drop-by-drop deposition of sacrificial mold material 16 is required only for the boundary or boundaries that define a surface of the subsequently applied model material 22. As a result, the volume of sacrificial mold material 16 that must be deposited on a drop-by-drop basis is thereby significantly reduced, thereby significantly reducing the time required to form the sacrificial mold that, in turn, defines the volumes of model material 22 comprising the actual finished model 10.

It must be noted that additional sacrificial mold material 16 may be deposited beyond that which is required to define the outer surfaces of the model material 22 and thus the outer surfaces of the finished model 10. For example, each layer 12 of a composite model 10C must provide a platform or support for the entire maximum horizontal dimensions of the sacrificial mold material 16 and model material 22 that comprise the next higher layer 12. As illustrated in FIGS. 2A-2C, temporary, removable support 26 for overhanging, cantilevered and/or undercut regions of the model material may be provided by additional sacrificial mold material 16 deposited as support material to provide a platform or support on which model material 22 defining the bottom of overhanging, cantilevered and/or undercut surfaces of the model can later be deposited. In this regard, and as illustrated in FIGS. 2A and 3A-3D and as discussed further below, the additional support structure 26 can be fabricated entirely of sacrificial mold material 16, or can be fabricated as a three dimensional grid 28 of sacrificial mold material 16 with the interior spaces 28S of the grid 28 being subsequently filled by model material 22 when the model material 22 of that layer 12 is deposited. It should be recognized, however, that a minimum of one layer of sacrificial mold material 16 is required between any additional model material 22 forming a support and the outer surface of any model material 22 above and below the support.

In a further example, again as illustrated in FIGS. 1A-1E and 3C, and 3D, voids 30 in a composite model 10C, that is, and for example, spaces between parts of a finished model 10 and hollow spaces within a finished model 10 that connect with the exterior, and in general any regions of the fabricated layers 12 of the composite model 10C not occupied by the actual finished model 10, may be filled during fabrication with "filler elements" 32 of model material 22 bounded and separated by walls, ceilings and floors comprised of sacrificial mold material 16.

Figure 3A:
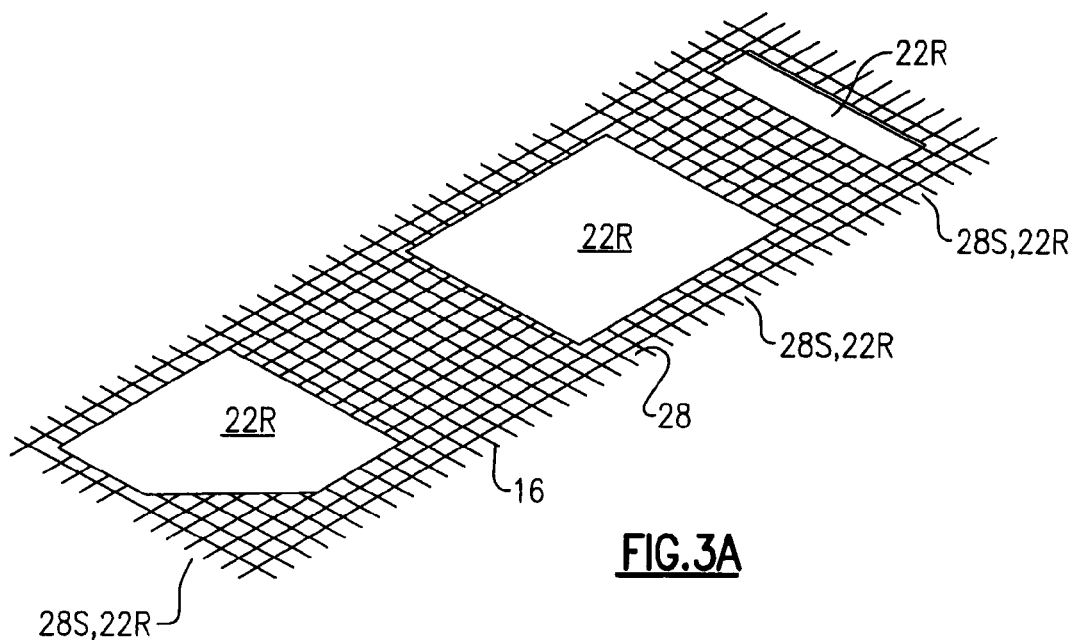
FIGS. 3A-3D illustrate a method of the present invention for fabricating voids and support elements using grids of sacrificial material and filler elements of model material separated by sacrificial material.
Figure 3B:
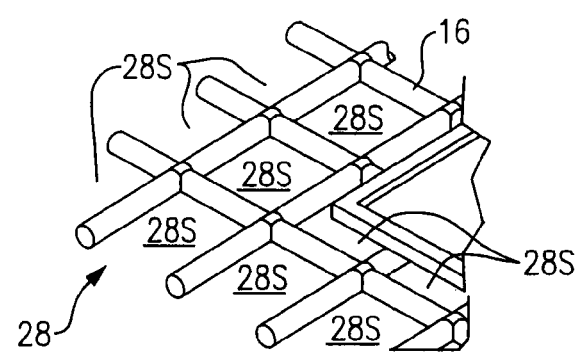
Figure 3C:
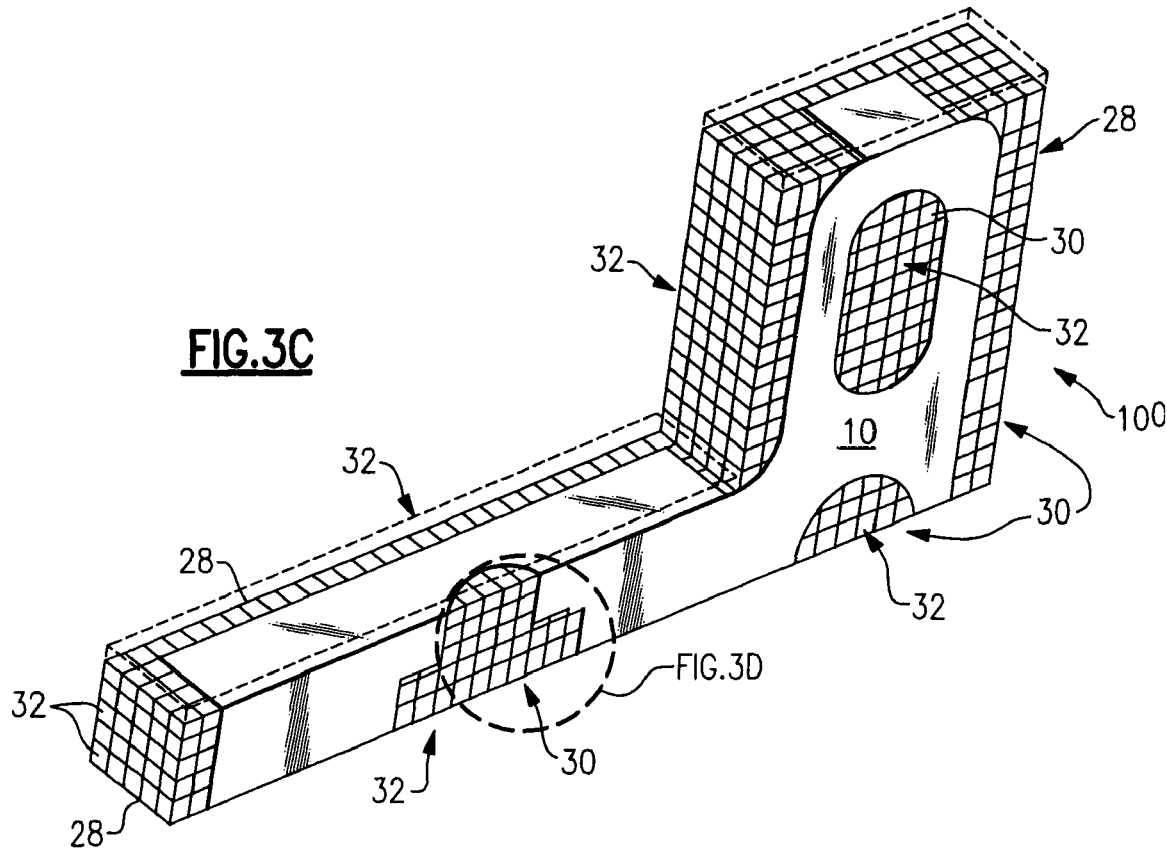
Figure 3D:
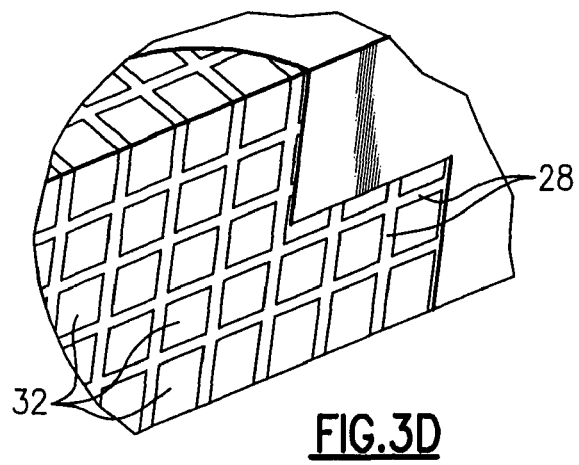

Briefly, each filler element 32 is formed by laying down a "floor" of sacrificial mold material 16 on one layer 12, laying down successively stacked boundary walls of sacrificial mold material 16 on succeeding layers, filling with model material 22, and laying down a final "ceiling" of sacrificial mold material 16 on the uppermost layer 12 of the filler element 32, as indicated by the uppermost layer 12 shown in dashed lines in FIG. 3C. Subsequent removal of the sacrificial mold material 16 will then result in separation or disconnection of the filler elements 32 from one another so that the filler elements 32 can then fall away and leave the open spaces or voids between or within the parts of the finished model 10. Again, as noted above, the "grid" delineating filler elements 32 need not be of rectilinear form, but may assume virtually any pattern or shape necessary or desirable to define the area comprising a void or support area within a layer or a number of layers, including patterns having irregular or curved or angled elements. It should also be noted that a filler element 32 need not be a cubical or rectilinear shape, but can be of any shape necessary to conform to adjacent surfaces of the model including, for example, rectangles, wedges and curved or slanted variants thereof and any curved shape that can be defined by the drop-by-drop deposition of sacrificial mold material, including shapes that are slanted or curved in two or three dimensions.

Next considering the deposition of model material 22, as described the model material 22 is deposited within the regions 22R defined by the sacrificial mold material 16 on a layer 12 after the drop-by-drop deposition of the sacrificial mold material 16 for that layer 12 is completed, wherein the regions 22R will include the interior spaces 28S of the grid 28. The model material 22 is deposited in a liquid form to fill the one layer deep cavities or regions delineated by the boundary or boundaries of the sacrificial mold material 16 and, again, the model material 22 solidifies or cures after it is deposited and has conformed and bonded to the previously deposited sacrificial mold material 16 and model material 22.

Unlike the sacrificial mold material 16, however, and differing from the systems of the prior art, the model material 22 is deposited as a spray 22S by a spray device 24 which moves in the X-Y plane, whereby model material droplets are deposited in and over all cavities previously created or defined by the sacrificial mold material 16, to a level that is at least equal to or exceeds the thickness of the current model layer 12. While the exact location of any particular model material 22 droplet is not precisely controlled, the droplets in aggregate are deposited with sufficient accuracy to ensure that any desired location in the X-Y coordinate system can be filled with the requisite amount of model material 22.

In the same general manner as the sacrificial support material 16, additional model material 22 may be deposited beyond that which is required to form the volumes comprising the model. For example, support elements 26 for overhanging, cantilevered and/or undercut regions of the model material 22 may be provided by additional model material 22 being deposited as support material to provide a platform or support on which sacrificial mold material 16 or model material 22 defining the overhanging, cantilevered and/or undercut surfaces of the composite model 10C or the finished model 10 can later be deposited. In this regard, and as discussed further below, the additional material used as a support structure can be fabricated entirely of sacrificial mold material 16, or as described above can be fabricated as a three dimensional grid 28 of sacrificial mold material 16 with the interior spaces of the grid 28 being subsequently filled by model material 22.

In a further example, voids 30 between parts of a finished model 10, that is, and for example, regions of the layers 12 not occupied by the actual finished model 10, or hollow spaces within a finished model 10 that connect with the exterior, may be filled during fabrication with "filler elements" 32 of model material 22 bounded and separated by walls, ceilings and floors comprised of sacrificial mold material 16. Again, each filler element 32 would be formed by laying down a "floor" on one layer, laying down successively stacked boundary walls on succeeding layers, and laying down a final "ceiling" on the uppermost layer of the filler element 32. Subsequent removal of the sacrificial mold material 16 will then result in separation or disconnection of the filler elements 32 of model from one another and from the remaining portions of the finished model 10 so that the filler elements 32 can then fall away to leave open spaces or voids between or within portions of the finished model 10. Again, it should also be noted that a filler element 32 need not be a cubical or rectilinear shape, but can be of any desired shape necessary to conform to adjacent surfaces of the composite model 10C or finished model 10 including, for example, rectangles, wedges and curved or slanted variants thereof and any curved shape that can be defined by the drop-by-drop deposition of sacrificial mold material 16, including shapes that are slanted or curved in two or three dimensions. In summary, the size and shape of the filler elements 32 or grid 28 elements is dependent on the geometry of the model and the filler elements 32 used to fill a small space or void or a semi-enclosed volume of the finished model 10 must be small enough to pass the through the available opening or openings of the filled space or semi-enclosed volume to permit removal thereof.

Figure 4A:
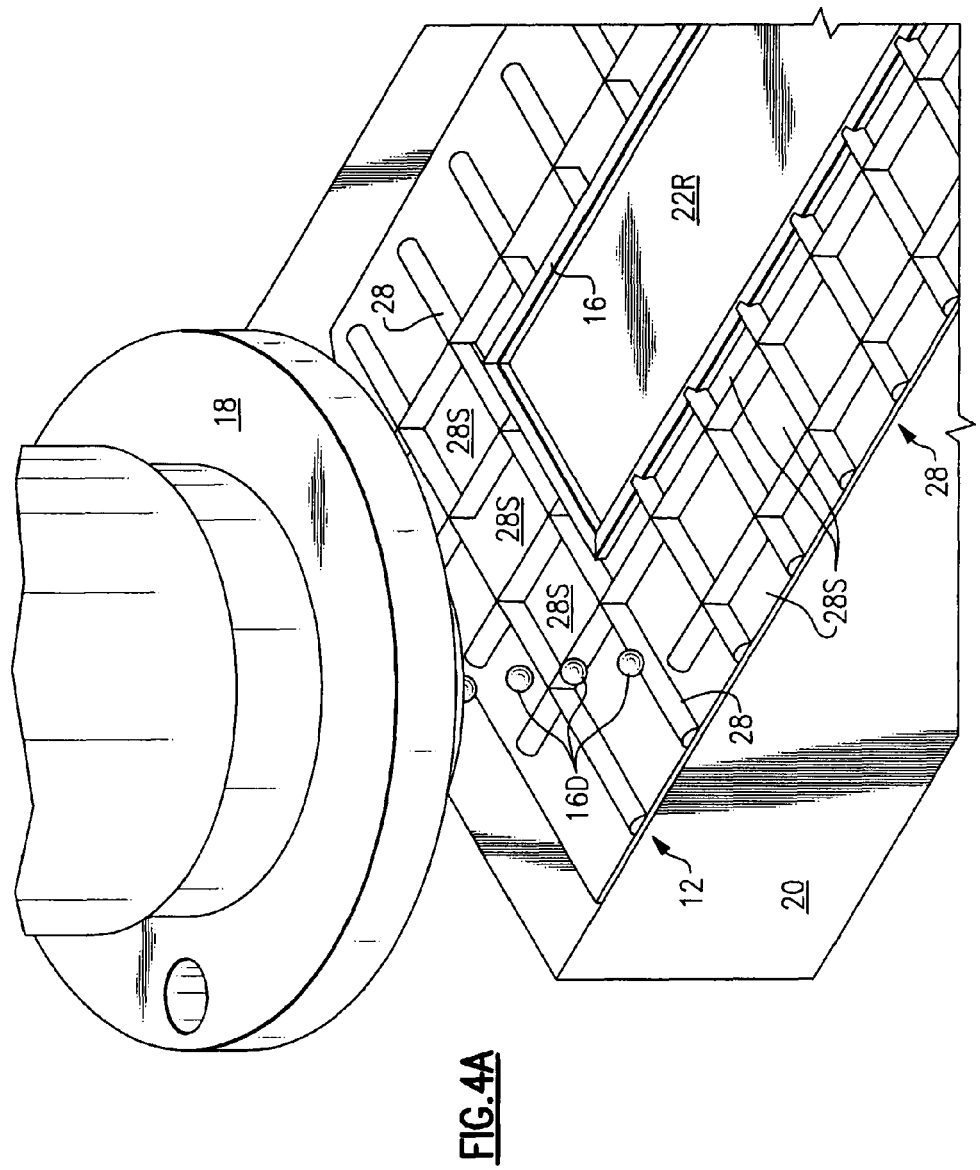

The above described process for constructing a composite model 10C is summarized in FIGS. 1A-1E and FIGS. 4A-4E. Referring to FIG. 4A, and as described, the construction of a layer 12 begins with the drop-by-drop deposition of drops 16D of sacrificial mold material 16 onto a previously existing layer 12, or the base 20, to delineate the regions 22R to be filled with model material 22, thereby defining the boundary or boundaries of the model material 22 and thus the surfaces of the finished model 10. As described, regions 22R include grid spaces 28S of a grid 28 that defines the boundaries of filler elements 32 used, for example, to fill voids 30 with removable model material 22.

Figure 4B:
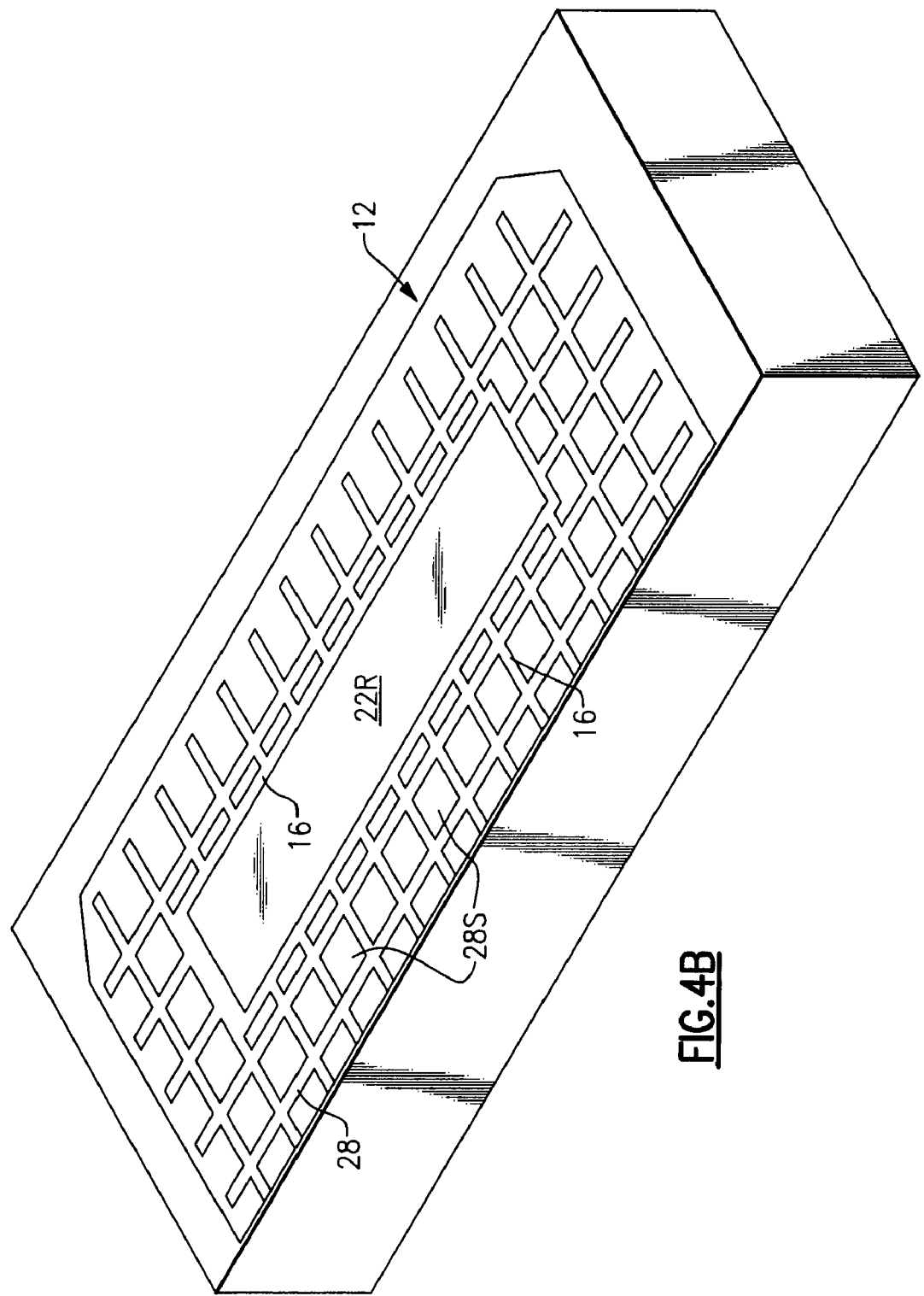

As illustrated in FIG. 4B, the result of this first step of the process is a support structure comprised of lines of sacrificial mold material 16 that were deposited on a drop-by-drop basis and that define a central region 22R and a plurality of grid spaces 28S that are to be filled with model material 22.

Figure 4C:
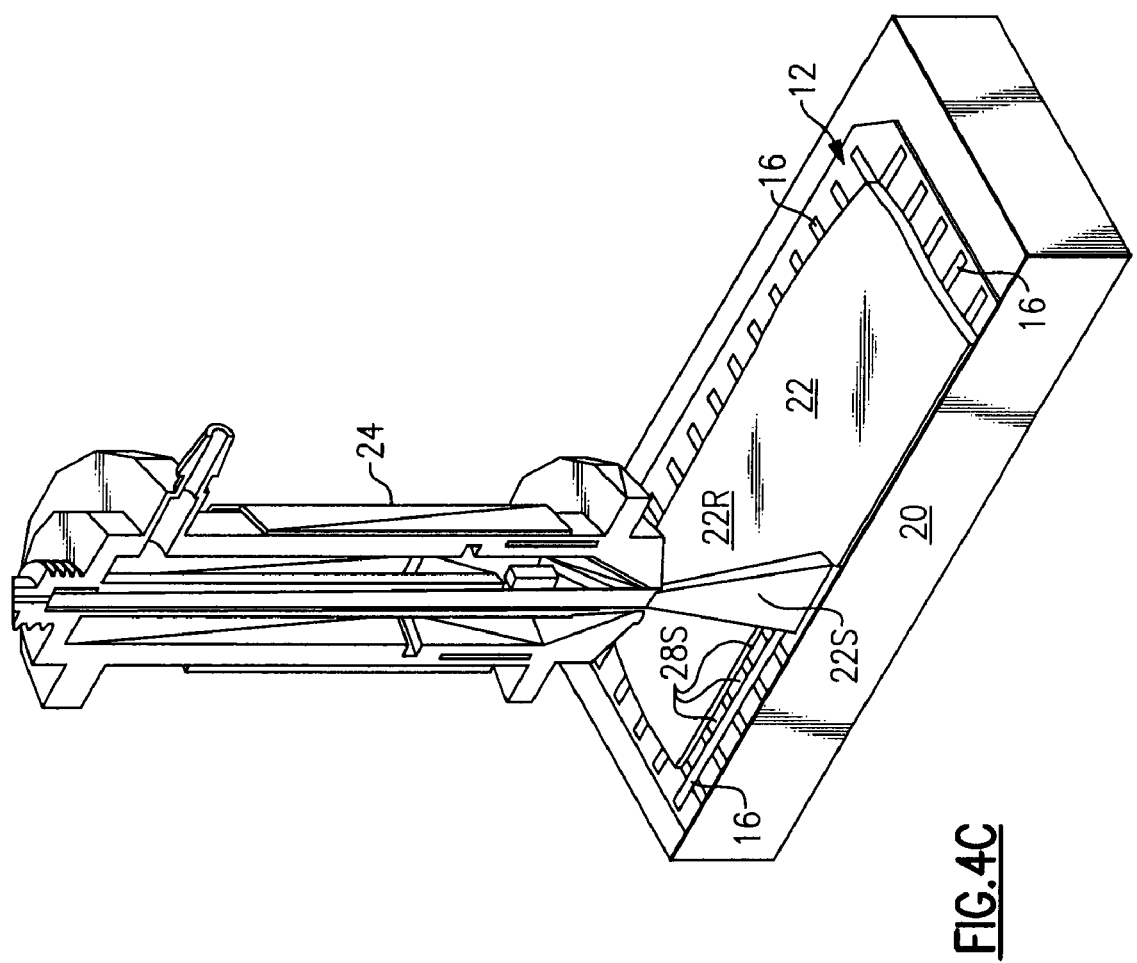

In the next step, illustrated in FIG. 4C, a spray device 24 deposits a layer of model material 22 over the entire layer 12 as a spray 22S wherein the sprayed model material 22 is deposited to fill the central region 22R and grid spaces 28S defined by a grid 28, if any. As illustrated in FIG. 4D, the spray device 24 covers the layer 12 to a depth sufficient to fill the one layer deep cavities or regions delineated by the sacrificial mold material 16.

Figure 4E:
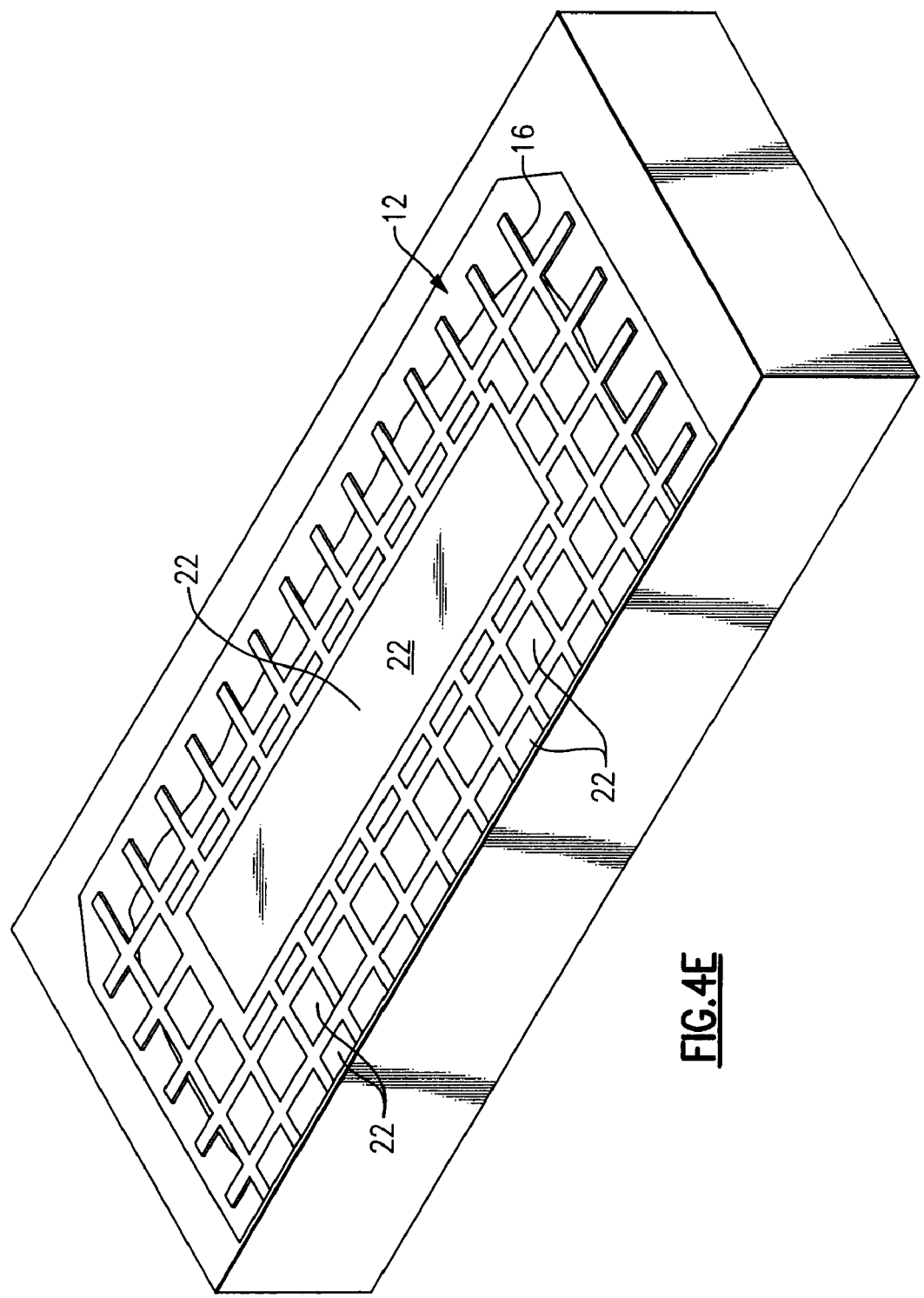

In the final step, the newly deposited layer 12 is planed by a conventional cutting device 34 to a desired thickness, with the planed material being removed by a vacuum source, so that the newly deposited layer 12 is, as illustrated in FIG. 4E, comprised of lines of sacrificial mold material 16 delineating spaces and regions filled by model material 22.

As will be described in further detail below, a suitable high deposition rate device 24 for depositing the model material 22 is an atomizing spray device capable of expelling very fine droplets of model material 22 over a controlled region at a relatively high deposit or flow rate. In comparison with the output of the drop-on-demand device 18 used to expel the sacrificial mold material 16, the model material 22 droplets are many times smaller; the flow rate is many times higher, and the area covered at a given time, that is, the spray region, is substantially larger than is possible with a drop-by-drop system. That is, the spray device 24 deposits the model material 22 at a rate that is typically at least 50% faster than the rate that the drop-on-demand device 18 deposits the sacrificial mold material 16, often at a rate that is at least twice as fast as the rate that the drop-on-demand device 18 deposits the sacrificial mold material 16. Most preferably, the spray device 24 deposits the model material 22 at a rate that is a plurality of times faster, e.g., ten or more times faster, than the rate that the drop-on-demand device 18 deposits the sacrificial mold material 16.

Again, the spray device 24 motion can occur along either axis independently or both axes simultaneously and the direction and rate of motion of the spray device 24 along each axis determines the angle of the vector of model material deposited. The velocity of the spray device 24 motion and the flow rate of model material 22 expelled from the spray device 24 determine the density of the model material 22 deposited. Again, dynamic modification of the respective X and/or Y endpoints of a vector path of the spray device 24 during execution of the vector permits a continuous transition from one vector to the subsequent vector.

It should also be appreciated that one or more sprays or passes of model material 22 deposition may be required to fill the mold cavities to the requisite level, particularly in those implementations using a single spray device 24, or multiple passes may be employed to build up the model material 22 in finer increments. Other implementations, however, and for example, could include a spray device 24 with a plurality of atomizing elements or nozzles to span the entire X or Y dimension of the layers 12, thus covering all of the mold cavities with possibly a single pass in the orthogonal direction. Other embodiments of a high deposition rate device 24 may also be employed, such as a device comprising a linear or rectilinear array of drop-on-demand jets capable of concurrently depositing a corresponding number of droplets. Still other implementations could employ different numbers of spray elements 24, or could employ, for example, a roller transfer system to deposit material over all of the mold cavities in one or more passes.

In conclusion with regard to the spray deposition of model material 22, it must be noted that the spray deposition of model material 22 is possible because the model material 22 need not be deposited with the care and precision associated with depositing the sacrificial mold material 16 because the sacrificial mold material 16 precisely establishes the ultimate exposed surface finish of the finished model 10. The model material 22 therefore need only be deposited with sufficient accuracy to ensure that the boundaries or cavities created by the sacrificial mold material 16 are adequately and sufficiently filled with a high degree of conformance. It will, therefore, be appreciated that the method and apparatus of the present invention can deposit model material 22 at a substantially higher rate than the drop-by-drop delivery of the sacrificial mold material 16 or the model material 22 in the systems of the prior art, thereby significantly reducing the time required to deposit the model material 22 and complete a layer. It will also be appreciated that the reduction in the time required to deposit the model material 22 together with the reduction in time required to deposit the sacrificial mold material 16 due to the lesser amount of sacrificial mold material 16 required to delineate the outer boundary or boundaries of the model material 22 results in a significant reduction in the overall time required to fabricate a finished model 10.

As described above, after the model material 22 is deposited in a layer 12, the sacrificial mold material 16 and model material 22 that exceed the specified layer thickness are removed in preparation for the deposition of the next subsequent layer 12. This process is repeated until the last layer 12 is deposited and the excess deposited material removed, with the composite model 10C being appropriately repositioned along the Z (vertical) axis for each subsequent layer 12.

As indicated in FIG. 2C, and as will be described further below with regard to a system employing the present invention, the material removal process can include, but is not limited to, cutting, grinding or milling an excess thickness of the deposited layer and a presently preferred embodiment employs a cutting device 34 that spans the entire X or Y dimension of the model and is capable of removing a relatively thin layer of the deposited material from an entire layer 12 in one pass in the orthogonal direction. The direction of cutting device 34 blade motion relative to the composite model 10C cutting surface, the velocity of the cutting device 34 motion and the rate of cutting device 34 blade rotation all affect the cut quality and determine the viable depth of the cut and the resulting surface finish. It should also be recognized that although FIG. 2C and others figures imply that the cutting device 34 is shown as oriented in the horizontal plane, that is, the cutting device 34 is shown as cutting along a horizontal plane, the orientation of a cutting device 34 in the horizontal or vertical plane is a matter of the specific design of the apparatus and that other orientations relative to the vertical and horizontal axes are equally feasible. It should also be noted that a derivative of this method employs two or more passes, cutting in each pass direction and removing thinner slices of the excess sacrificial mold material 16 and model material 22 on each pass by adjusting the vertical position of the composite model 10C between passes. Another derivative of this approach employs two or more passes, cutting in only one pass direction and positioning the composite model 10C to avoid cutting device 34 contact while the cutting device 34 is traveling in the opposite direction.

An alternative material removal implementation employs a smaller cutting device 34 having a width less than the narrowest dimension of the layers 12 along the cutting plane and which is capable of removing material from a smaller area than the full width cutting device 34. The narrow cutting device 34 therefore moves in both the X and Y directions, that is, along the orthogonal axes defining the cutting plane, to remove excess material 16, 22 from the entire model building area. Motion can occur along either axis independently or both axes simultaneously and the direction and rate of motion along each axis determines the angle of the vector of material removal. The velocity of the cutting device 34 motion and the rate of cutting device 34 blade rotation determine the viable depth of the cut and the resulting surface finish. As in the deposition of materials, dynamic modification of the respective X and/or Y endpoints of the motion vectors permits a continuous transition from one cut vector to the subsequent vector.

In addition to the cutting device 34, a vacuum device 36, only diagrammatically indicated in FIG. 2C and described further below, is employed to capture loose material particles resulting during the material removal process, regardless of the specific cutting technique employed.

Next, considering the sacrificial mold material 16 and the model material 22, the sacrificial mold material 16 can consist of one or more materials that can be deposited simultaneously or sequentially by drop-by-drop ejection or emission by a drop-on-demand device. The characteristics of the sacrificial mold material 16 or materials must be such that sacrificial mold material 16 solidification or curing will occur during or after deposition of the drops 16D to allow each drop 16D to conform to its intended position and to bond to preceding neighboring drops, and the solidification or curing can be the result of physical or chemical processes, depending on the characteristics of the sacrificial mold material 16.

In a like manner, the model material 22 can consist of one or more materials that can be deposited simultaneously or sequentially as a spray 22S of fine droplets and, again, the model material 22 solidification or curing can be the result of physical or chemical processes which occur during or after deposition of the model material 22 to allow the model material 22 to conform to and bond to the previously deposited sacrificial mold and model material.

The characteristics of the sacrificial mold material 16 and the model material 22 must differ mechanically or chemically in such a way, however, that the sacrificial mold material 16 can be selectively removed after the fabrication of the part or structure is completed. For example, in some implementations the sacrificial mold material 16 may have a lower melting temperature than the modeling material 22 so that the sacrificial mold material 16 can be removed by raising the composite model 10C to an appropriate temperature, or may be dissolvable by a solvent that effects the sacrificial mold material 16 but does not effect the modeling material 22, so that the sacrificial mold material 16 can be dissolved away by the solvent.

In presently preferred example embodiments of the system and apparatus of the present invention, the sacrificial mold material is comprised of a crystalline wax-based substance and the model material is comprised of a thermoplastic substance. The sacrificial mold material is deposited on a drop-by-drop basis employing drops having an average diameter of about 0.003 inch to 0.004 inch and at an average rate of about 0.5 KHz to 15 KHz at a temperature of about 115° C. and over an average emitter to layer distance of about 0.090 inch to form a line having a width of about 0.015 inch.

The model material is deposited as a spray of droplets having an average diameter of about 0.0003 inch and at an average rate of about 2.5 picoliters per second at a temperature of about 120° C. and over an average spray emitter to layer distance of about 0.75 inch to 1.25 inch with an included spray angle of 17° to cover a width of about 0.150 inch.

The layers, prior to the removal of excess material, have a thickness of about 0.001 inch to 0.006 inch.

It will be recognized, however, that other sacrificial mold materials 16 and model materials 22 may be used that meet the general functional requirements described herein above. For example, the model material 22 may be comprised of a metal or ceramic material in powdered form, either sprayed as a dry substance or suspended in a liquid, and solidified or cured by heat, light, a sintering process or an appropriate chemical agent, thus allowing the fabrication of metallic or ceramic models or parts. In a like manner, the sacrificial mold material 16, in turn, may be selected to have characteristics complementary to the model material 22. For example, if the model material 22 is cured by heating or a sintering process, the sacrificial mold material 16 should have a melting point lower than that of the model material 22 so that the model material 22 does not deform when the sacrificial mold material 16 support is removed. Either the model material 22 must be self supporting during its curing process after the sacrificial mold material 16 has been removed, or the sacrificial mold material 16 characteristics must be such as to allow the sacrificial mold material 16 to support the model material 22 during the curing of the model material 22. For example, the sacrificial mold material 16 may have a melting temperature comparable to that of the model material 22 but may be dissolvable by a solvent, thereby allowing heat "curing" of the model material 22 with subsequent removal of the sacrificial mold material 16 by the solvent.

In this regard, it should be recognized that the initial solidification and curing of the sacrificial mold material 16 and model material 22 upon deposition and subsequent changes in the state of either or both of the model material 22 and sacrificial mold material 16 during the removal of the sacrificial mold material 16 may be different processes. That is, the initial curing or solidification of the materials on deposition may be an initial chemical or temperature based process wherein the materials initially solidify upon cooling or upon the evaporation of a solvent from the material. The subsequent stage of the process in which the sacrificial mold material 16 is removed may be part of a second "curing" process in which there is a significant state change in the model material 22 as well as the sacrificial mold material 16. For example, the composite model 10C formed of the sacrificial mold material 16 and model material 22 may be raised to a temperature that is sufficient to melt away the sacrificial mold material 16 but that is also high enough to cause a state change in the model material 22, such as the final curing of a ceramic material or the evaporation of a solvent from a solidified model material 22 comprised of a metal or a ceramic and the solvent. In this approach, it is necessary for the sacrificial mold material 16 to remain sufficiently solid to support the model material 22 until the model material 22 becomes self supporting.

Possible sacrificial mold materials 16 appropriate for use with a ceramic or a metal model material 22 include, for example, micro-crystalline wax and thermoplastics materials.

B. Model Fabrication System

Referring now to FIGS. 5A-5D, illustrated therein is a typical system 38 of the present invention, which includes a vertically positionable workpiece platform 40 upon which the composite model 10C being fabricated is mounted. The position of the workpiece platform 40 can be adjusted along the Z (vertical) axis 42 to vertically position the composite model 10C with respect to a stationary tool platform 44, and thereby with respect to the sacrificial mold material drop-on-demand device 18, the model material spray device 24, and the cutting device 34 according to the needs of a layer 12 being currently deposited. As shown, the sacrificial mold material drop-on-demand device 18 and the model material spray device 24 are mounted on a Y axis carriage 46 that is moveable and positionable along the Y axis 48 on a Y axis rail 50 that is, in turn, mounted on an X axis carriage 52 and movable along the X axis 49. The X axis carriage 52 is, in turn, mounted on and is movable and positionable along a pair of X axis rails 54 that are orthogonal to the Y axis rail 50 and that are mounted onto the stationary tool platform 44 on either side of a workpiece opening 56 in the tool platform 44 through which the workpiece platform 40 and composite model 10C can be raised and lowered along the Z axis 42.

The arrangement of the X and Y carriages 52, 46 on the tool platform 44 and the capability of vertical movement of the workpiece platform 40 independently of the tool platform 44 thereby allows the workpiece platform 40 and the composite model 10C, and in particular the layer 12 currently being fabricated, to be positioned vertically with respect to the sacrificial mold material drop-on-demand device 18 and the model material spray device 24. At the same time, the sacrificial mold material drop-on-demand device 18, the model material spray device 24, and the cutting device 34 may be freely positioned along the X and Y axes, that is, in the horizontal plane, with respect to the model and layer 12 currently being fabricated.

It will be appreciated that the workpiece platform 40 and the tool platform 44, the X and Y carriages 52, 46, the rails 54, 50, the actuators 58X, 58Y and 58Z for movement and control of the X and Y carriages 52, 46 and the cutting device 34 in the horizontal plane and perpendicular to the vertical axis, and the system controller 60 for controlling operation of the X, Y and Z axis actuators 58X, 58Y and 58Z are all well known in the art and need not be discussed in further detail herein. It will also be noted that the designations of the X, Y and Z axes may be interchanged at will, with the relationships between the axes being the significant factor rather than their specific designations.

Figure 5A:
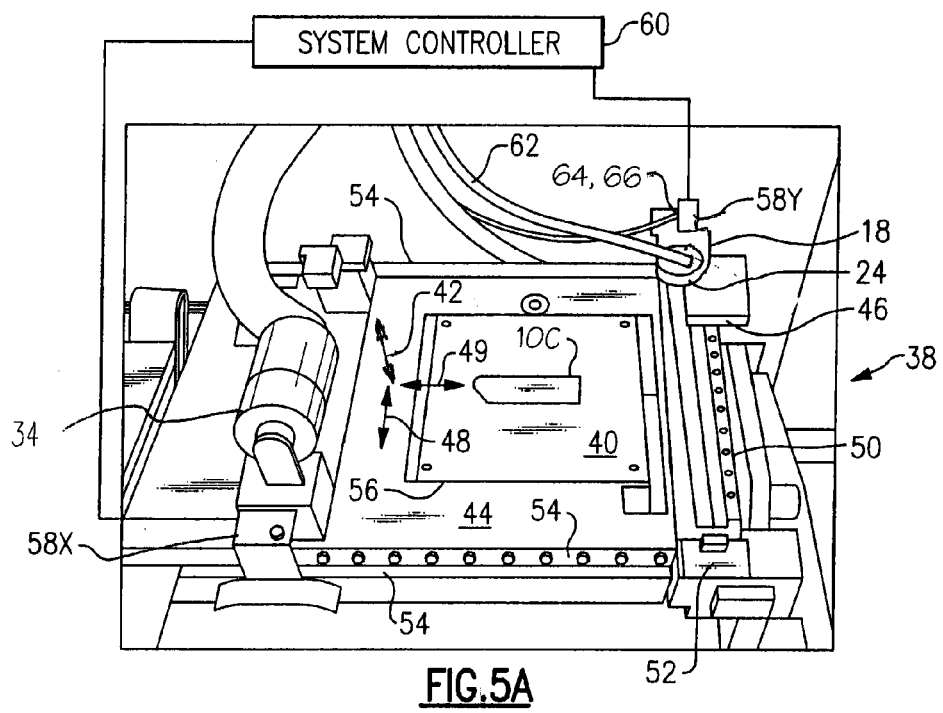
FIGS. 5A-5D illustrate a system for fabricating a 3D model.
Figure 5B:
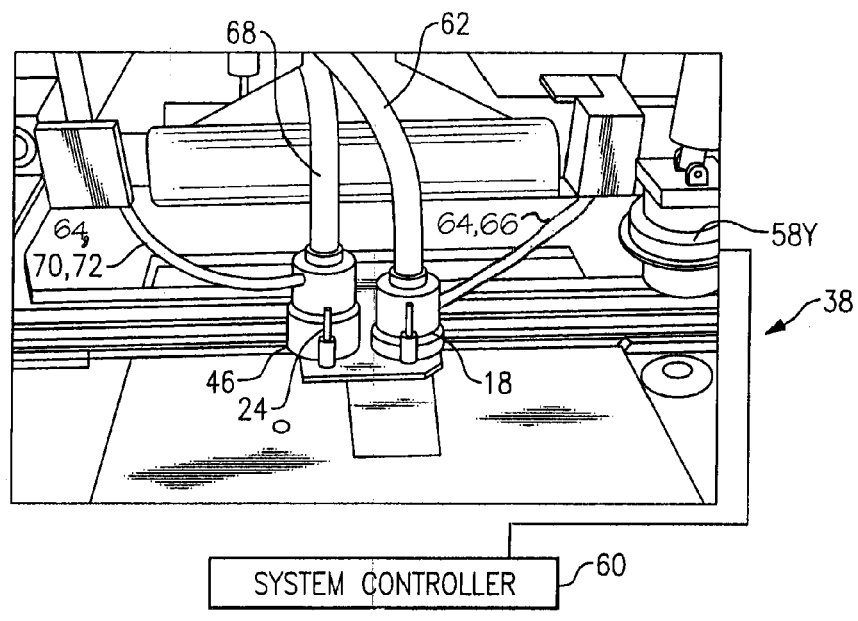
Figure 5C:
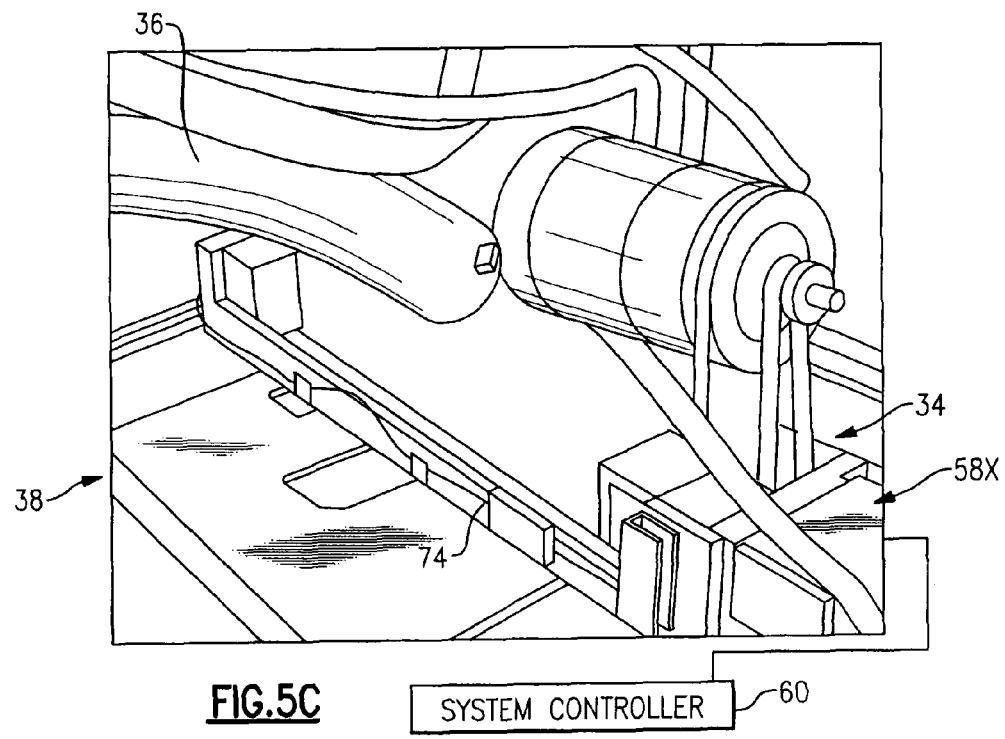
Figure 5D:
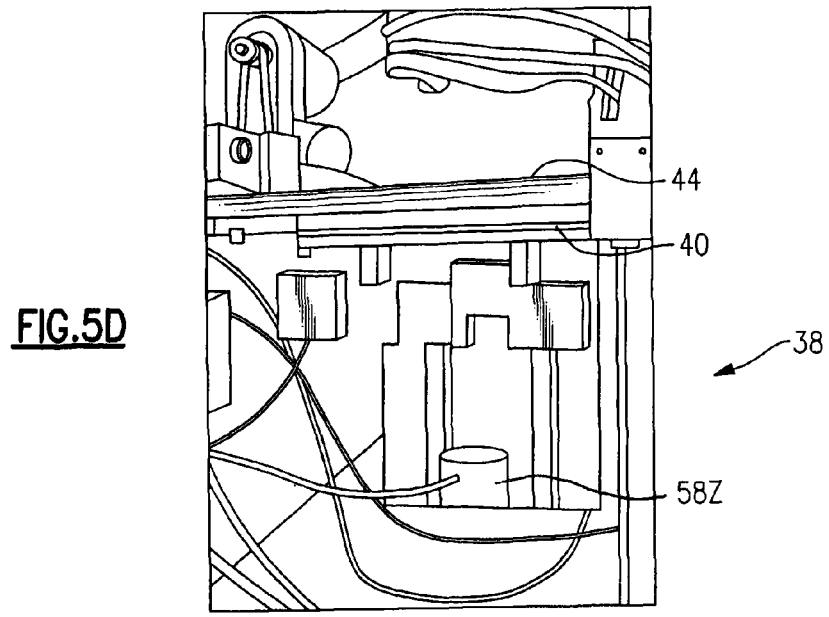

Considering FIGS. 5A and 5B, it will be seen that in a presently preferred embodiment of the present invention, the drop-on-demand device 18 and the model material spray device 24 are mounted together, that is, side by side, on the Y axis carriage 46 to move with the Y axis carriage 46. It will be understood that the X and Y axes locations and movements of the drop-on-demand device 18 and the model material spray device 24 are readily controlled by the same actuators, with the system controller 60, taking into account their offsets with respect to one another in the X-Y plane when determining the desired locations of the drop-on-demand device 18 and the model material spray device 24. It will also be recognized that the drop-on-demand device 18 and the model material spray device 24 may be located, for example, on opposite sides of the Y axis carriage 46 with the system controller 60 again taking into account the physical offset of the drop-on-demand device 18 and the model material spray device 24 relative to one another. In other embodiments the drop-on-demand device 18 and the model material spray device 24 may be located on separate Y axis carriages 46 with the system controller 60 and actuators 58Y controlling the two Y axis carriages 46 separately from one another, including avoiding physical interference between the two Y axis carriages 46.

Lastly in this regard, it is shown that the drop-on-demand device 18 requires a sacrificial mold material supply connection 62, a power connection 64 and a control connection 66 to control the drop-by-drop dispensing of the sacrificial mold material 16 by the drop-on-demand device 18. In addition, it should be noted that the sacrificial mold material supply connection 62, typically a flexible tube of suitable material, may be heated to a specified temperature so as to deliver the sacrificial mold material 16 to the drop-on-demand 18 at the correct temperature for dispensing of the sacrificial mold material 16, and that the drop-on-demand device 18 may include an internal heating element for these same purposes. These connections and provisions, however, are well known and customary in the art and not discussed in further detail.

As will be described further in the following discussion of the model material spray device 24, the model material spray device 24 will similarly require a model material supply connection 68, a power connection 64 and a pressurized propellant connection 72 to control the spray dispensing of the model material. The model material supply connection 68, typically a flexible tube manufactured from a suitable material, will also typically be heated to a specified temperature so as to deliver the model material 22 to the model material spray device 24 at the correct temperature and pressure for dispensing of the model material 22 as a spray, and the model material spray device 24 may typically include an internal heating element for these same purposes.

As previously discussed and as shown, the 3D model fabrication apparatus of the present invention will include a cutting device 34 for reducing each applied layer to the desired resulting thickness, as described above. In the present preferred embodiment, the cutting device 34 is mounted on a cutting carriage 74 that is moveable along the X axis rails 54 by a corresponding actuator and is a full width cutting device, that is, will cut across the full Y width of the workpiece platform and thereby across the full Y width of the widest model that can be accommodated by the system. As shown, the cutting device 34 will further include appropriate power connections and a vacuum connection for sucking and removing any cut material from the area of the model.

C. Model Material Spray Device

As described hereinabove, the method and apparatus of the present invention differs fundamentally from the method and systems of the prior art in that the model material is deposited by a spray device 24, which expels a fine spray or droplets of molten model material 22 at a rate that is substantially higher than that attainable with drop-on-demand print heads typically employed in three dimensional printing and model making. The model material 22 droplets are deposited in and over all cavities, boundaries, and areas, etc. previously created or defined by the sacrificial mold material and, while the exact location of any particular droplet is not precisely controlled, the droplets or deposited model material in aggregate are deposited with sufficient accuracy to ensure that any desired location in the coordinate system can be filled with the requisite amount of model material. The method and apparatus of the present invention result in a significant reduction in the time required to fabricate a given model.

It must also be noted that, due to the inherent and fundamental differences between the structure, operation and functioning of spray devices with regard to drop-on-demand print heads, the spray device 24 can accommodate a much broader range of materials, with regard to their composition, particle size and physical properties including temperature, viscosity and surface tension, than can be accommodated by a conventional a drop-on-demand device. Also, and unlike drop-on-demand print heads, the spray devices 24 do not rely on piezoelectric actuators or other electromechanical devices, which inherently limit the frequency at which drops can be emitted and thereby the delivery rate of such drop-on-demand devices.

In general, the spray device 24 of the present invention implements the Bernoulli Principle that states that as the speed of a moving fluid increases, the pressure within the fluid decreases, and thereby functions in the same general manner as a number of spray painting devices. In the spray device of the present invention, a thermally controlled pressurized propellent, such as air, is directed past the outlet of a supply tube filled with molten model material 22 and a resulting pressure drop established at the model material outlet draws or sucks droplets of model material out of a supply tube. The air flow responsible for the pressure drop then propels the droplets out of the output orifice of the spray device 24, resulting in a spray 22S of molten model material 22. In this regard, the spray device 24 has an output orifice that is, for example, approximately ten times the size of that found in a typical drop-on-demand device. This difference contributes notably to the significantly higher output flow through the spray device 24 with regard to a drop-on-demand device and also facilitates the use of materials having much larger particle sizes than can be used with drop-on-demand devices. The size of the output orifice also reduces the probability that the orifice will become blocked or clogged, which makes the spray device 24 much more reliable than a conventional drop-on-demand device. The absence of any moving components in the spray device 24 also contributes to its high reliability and competitive cost with respect to a conventional drop-on-demand device. It must also be noted that while air is used as the propellent in one embodiment of the present invention, and while the propellent will be referred to as air in the following description, other propellants or gases may be employed as the propellent depending upon the requirements and characteristics, for example, of the sacrificial mold material, the model material and the spray device.

With regard to the design requirements for the spray device, the spray jet is a critical component in a complex system and, in order to function properly, several aspects of the spray jet design and external system parameters must be considered and brought into cooperation. For example, the incoming air pressure and temperature, the formation of the air path, and the shape of the air outlet and its proximity and spatial relation to the material supply tube outlet all combine to establish the rate of air flow past the material outlet and thereby the associated pressure drop at that location. This air pressure drop, combined with the pressure behind the molten model material and the physical properties of the molten material, the size of the flow restrictor and the cross sectional areas of the material flow restrictor, the supply tube, and the material outlet, all of which are discussed below, all interact to establish the droplet size and the generation rate. In a like manner, the rate of air flow out of the device and the size and the shape of the spray device output orifice combine to establish the shape and range of the model material delivery path and the velocity of the expelled droplets. In this regard, the output region of the model material delivery path is typically of circular cross section, e.g., conical, and orthogonal to the orientation of the spray device so that the model material is deposited in a circular pattern or region upon striking a surface, that is, a base or a previously deposited layer of the model. It must be noted, however, that the shape of, for example, the output orifice and related sections of the spray device may be formed so that the region of deposition of the model material is, for example, fan shaped, elliptical or a transverse oval.

Figure 6A:
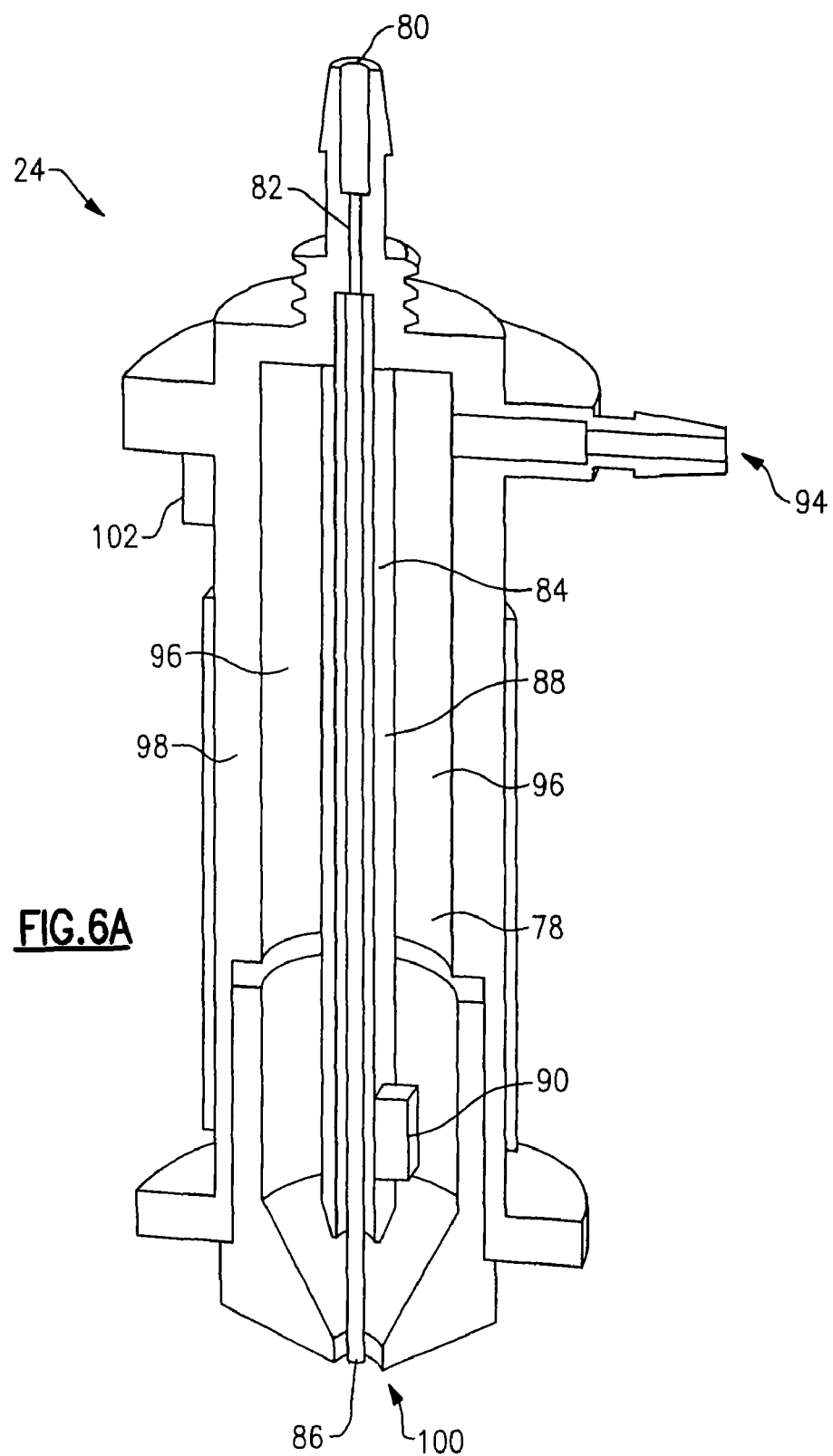
FIGS. 6A-6C illustrate a spray device for spraying the model material.
Figure 6B:
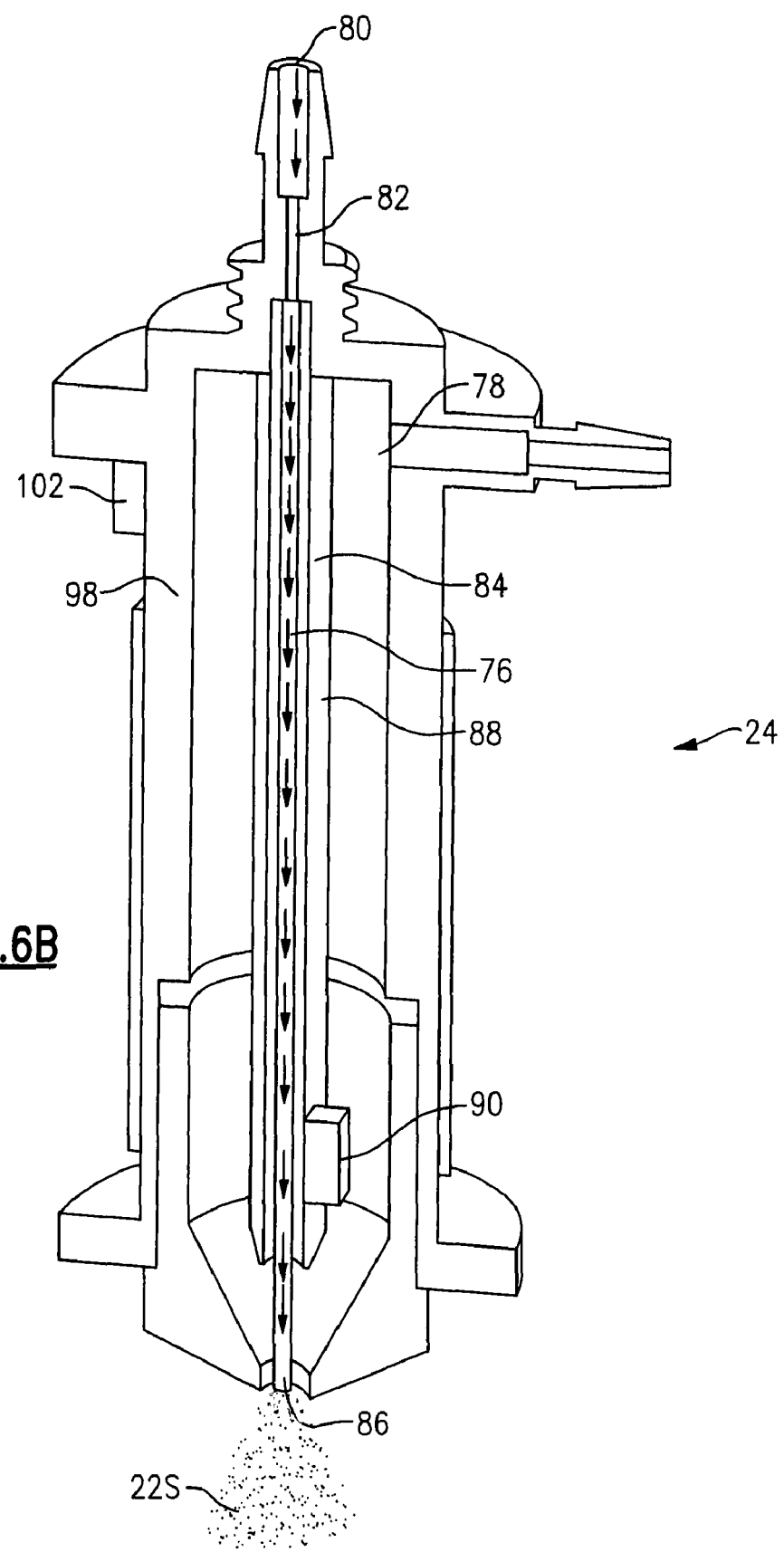
Figure 6C:
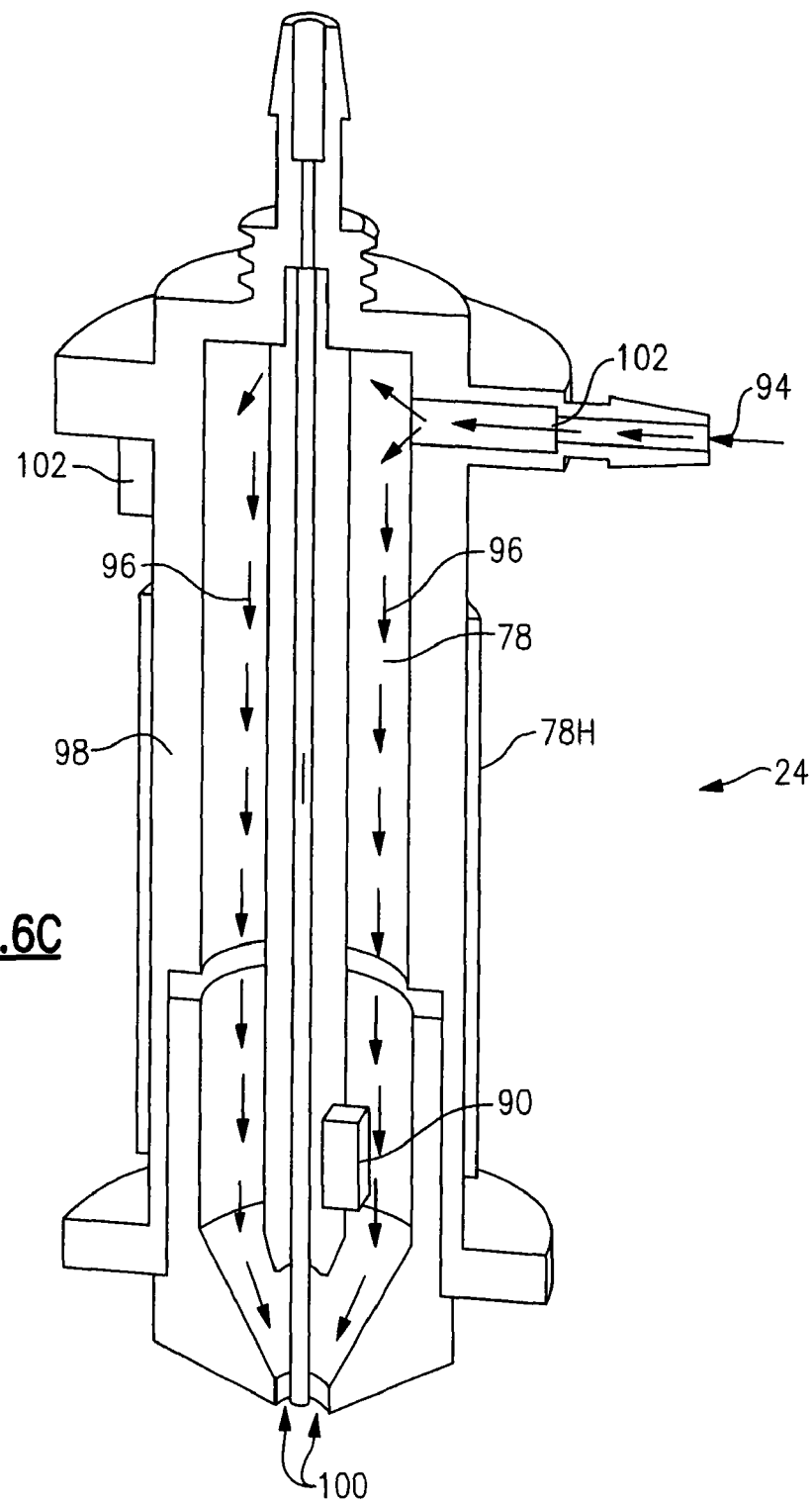

Therefore considering the construction of a spray device of the present invention in further detail, FIG. 6A illustrates a cutaway view of a spray device 24, while FIG. 6B illustrates the model material path 76 through the spray device 24 and FIG. 6C illustrates the air flow passage 78 of the air through the spray device 24. As shown in FIGS. 6A and 6B, the model material path 76 includes a model material inlet 80, a model material flow restrictor 82, a model material supply tube 84 and a model material outlet 86. Molten model material 22 is introduced, at a desired temperature, via the model material inlet 80 through the temperature controlled model material connection 68 and flows through the model material flow restrictor 82 and into and through the model material supply tube 84 from which it is drawn out as air flows past the model material outlet 86 of the model material supply tube 84. As indicated, model material path 76 is thermally controlled by a dedicated model material path heating element 88 and a model material temperature sensor 90 that are integrated into the model material path 76 to facilitate thermal control of the model material path and thereby the temperature of the model material flowing therethrough. Controlling the temperature of the material path 76 and, hence, the material 22 itself, has two distinct purposes. It ensures that the physical properties of the model material 22 that are affected by temperature are suitably controlled and, secondly, it serve to enable or disable the jet. Material viscosity has a significant impact on spray effectiveness and is directly influenced by the model material temperature as the material is ejected as a spray. In addition, controlling the model material 22 temperature within the model material flow path 76 permits the jet to effectively be disabled or enabled, within limits, by respectively cooling or heating the supply tube of the model material flow path 76 and thus the model material 22 therein. In this regard, it must be noted that the flow restrictor 82 in the model material flow path 76 may be used to modulate the rate of model material 22 flow into the spray device 24 and, subsequently, the rate of model material 22 flow out of the device 24.

Referring now to FIGS. 6A and 6C, therein is illustrated the air flow passage 78 through the spray device 24 wherein the air flow passage 78 includes the air inlet 94, the air channel 96 formed between the model material supply tube 84, the outer cylindrical body 98 of the spray device 24, and the air outlet 100. As shown, air enters the spray device 24 from the air supply connection 70, 72, via the air inlet 94, and flows through the air channel 96 formed between the model material supply tube 84 and the outer cylindrical body 98 of the spray device 24 to the air outlet 100 surrounding the model material outlet 86. The cross sectional area of the air flow path 78 is reduced in the area of the air outlet 100 and the model material outlet 86 by the funnel shape of the air outlet 100 and the diameters of the air outlet 100 and the model material supply tube 84, thus resulting in an increase in the speed of the air as the air flows in this area and, according to the Bernoulli Principle, a decrease in the air pressure in this area. The position of the material output 86, in relation to the air outlet 100, may be adjusted to optimize the differential pressure and flow rate. The decease in air pressure draws droplets of molten model material 22 from the model material outlet 86 of the supply tube 84 and the droplets are carried out of the nozzle formed by the air outlet 100 as a spray 22S of molten model material 22 to be deposited on a layer 12 of the composite model 10C. As illustrated, the cross section of the model material outlet 86 of the model material supply tube 84 and the air outlet 100 are typically of circular cross section and form a conical nozzle so that the spray 22S is similarly of a conical shape so that the model material 22 is deposited in a circular pattern or region upon striking a topmost layer or surface 12 of the model. As discussed, however, air outlet 100 and related sections of the spray device 24, such as the model material outlet 86 of the model material supply tube 84, may be formed so that the shape of the spray 22S and the corresponding region of deposition of the model material 22 is, for example, fan shaped, elliptical, oval or some other desired shape.

As described, the temperature of the air passing through the spray device 24 is critical to its operation as the air passing through the spray device 24 performs the dual functions of drawing model material droplets out of the model material outlet 86 and propelling the model material droplets to their intended impact region on the current layer 12. If the air temperature is too low, as is often the case with normal ambient air temperatures, the air may sufficiently cool and solidify the droplets before they are deposited, preventing the droplets from adequately adhering to each other and to the previous layer 12. If, however, the air temperature is too high, the ejected model material 22 may be at a sufficient temperature such that it could heat the previously deposited material 16, 22 to the point of either undesirably delaying the solidification time or, in an extreme case, damaging the finish or integrity of the previously deposited material 16, 22. Consequently, the air provided to and passing through the air flow path 78 of the spray device 24 must be within a controlled temperature range.

The present invention encompasses two methods for providing air at the correct temperature, one of which, discussed above, is heating the air as it passes through an air supply connection tube to the air flow passage 78. An alternate method places an air heating element 78H in the air flow passage 78 (FIG. 6C), that is, in the air flow channel 96 between the model material supply tube 84 and the outer cylindrical body 98 of the spray device 24, or around the cylindrical body 98 of the spray device 24. Either method will require monitoring the temperature of the air flowing through the air flow passage, and FIG. 6C illustrates a temperature sensor 102 located on the outer upper surface of the cylindrical body 98 of the spray device 24 to control the temperature of the cylindrical body 98 and thus the air in air flow passage 78. It is recognized that while this location for an air temperature sensor does not directly measure the immediate temperature of the air within the body of the spray device, the sensor will measure the long term temperature of the cylindrical body and thus the long term average of the air within the spray device, which is the parameter of primary concern.

An exemplary embodiment of a spray device 24 of the present invention may spray a thermoplastic at a temperature of about 120° C., an air pressure of about 20 psi, a flow rate of about 5.0 cfm and a droplet diameter of about 0.0003. Typical dimensions for such an implementation would include a body length of approximately 1.8 inches from the tip of the spray nozzle to the material inlet port and approximately 1.3 inches between the tip of the spray nozzle and the air inlet port. The main body would, for example, have an exterior diameter of approximately 0.36 inch and an interior diameter of approximately 0.25 inch. The material feed tube would have an interior diameter of approximately 0.030 inch and an exterior diameter of approximately 0.06 inch, which the heater element 88 would increase to approximately 0.1 inch. The nozzle section would taper from an interior diameter of approximately 0.25 inch to an interior diameter of approximately 0.04 inch and the tapered section would be approximately 0.25 inch long, so that the interior of the nozzle section would taper at an angle of approximately 60° relative to the longitudinal axis of the spray device 24.

It will be apparent from the above description of the present invention that the present invention offers a number of significant advantages over the systems of the prior art. For example, a system of the present invention significantly improves the material flow rate of the system by depositing the model material as a spray rather than by a drop-on-demand, resulting in significant improved system efficiency and improved costs. The system of the present invention also offers significantly improved reliability over the systems of the prior art by eliminating the 0.003 inch drop orifice and piezoelectric base actuator used in such prior art systems for delivery of the model material. As described, the system of the present invention instead employs a spray jetting device with a substantially larger jetting orifice for the delivery of the model material, resulting in a more robust mechanism with no moving parts, thereby reducing the chances of orifice blockages and enhancing the reliability of the model material delivery mechanism.

The use of a spray device with a larger orifice also allows the use of model materials with a broader range of physical characteristics, including melt temperature, viscosity, surface tension and particle size, which are not available with drop-on-demand technologies. In addition, a system of the present invention "floods" a previously deposited mold of sacrificial mold material with the spray of model material, thereby ensuring improved conformance between the model material and the sacrificial mold material and providing an improved surface finish because the surface dimensions and finish are determined largely by the drop-by-drop deposited sacrificial mold material.

It will be noted that the system of the present invention also provides yet other advantages over the systems of the prior art. For example, a system of the present invention is capable of fabricating "filler" volumes or regions by depositing a grid comprised of drop-on-demand deposited sacrificial mold material that is subsequently filled by spray deposited model material to thereby form "filler elements". As a result, a bulk of a filler region is deposited by spray deposition rather than by drop-on-demand methods, thereby enhancing the speed and efficiency with which filler volumes or regions can be fabricated.

The term "boundary", as used within this specification and the appended claims, is intended to be construed broadly and cover any border, barrier, perimeter edge or surface which defines an internal mold, cavity or area which is to be subsequently filled with the model material.

Since certain changes may be made in the above described apparatus for fabricating three-dimensional models using a spray device without departing from the spirit and scope of the invention herein involved, it is intended that all of the subject matter of the above description or shown in the accompanying drawings shall be interpreted merely as examples illustrating the inventive concept herein and shall not be construed as limiting the invention.

We claim:

1. A system for fabricating a three dimensional model on a layer by layer basis, the system comprising:
    a drop-on-demand device for forming a mold of mold material; and
    a high deposition rate device for filling the mold with a model material at a rate faster than a rate at which the mold material is deposited,
    wherein the high deposition rate device comprises
        a spray device body having a model material path and an air flow path terminating in a nozzle for dispensing the model material a high flow rate,
        the model material path includes
            a model material inlet connectable solely to a model material supply,
            a model material flow restrictor for controlling a flow of model material through the model material passage,
            a model material passage, and
            a model material outlet connected from an output end of the model material passage,
            a model material passage temperature sensor for sensing a temperature of the model material in the model material flow passage, and
            a model material passage heating element, responsive to the model material temperature sensor, for controlling the temperature of the model material in the model material flow passage,
        the air flow path includes
            an air inlet connectable solely to an air supply,
            an air channel formed between the model material supply tube and the spray device body,
            an air outlet,
            an air flow path temperature sensor for sensing a temperature of an air flow in the air flow path, and
            an air flow path thermal control element, responsive to the air flow path temperature sensor, for controlling the temperature of the air flow in the air flow path,
        a cross sectional area of the air flow path is reduced, in a region of the air outlet, to cause an increase in speed of an air flow and a decrease of an air pressure in the region of the air outlet thereby to draw model material from the model material outlet and dispense a spray of model material from the nozzle.

2. The system for fabricating the three dimensional model on the layer by layer basis according to claim 1, wherein the high deposition rate device is a spray jet device.

3. The system for fabricating the three dimensional model on the layer by layer basis according to claim 2, wherein the spray jet device includes a propellant for propelling the model material and a separate delivery and temperature control for controlling the temperature at which the model material is delivered.

4. The system for fabricating the three dimensional model on the layer by layer basis according to claim 1, wherein the model further comprises:
    at least one filler element for filling at least one of a void and a support region of the model on a layer by layer basis, and the at least one filler element is bounded by the mold material and filled by the model material.

5. The system for fabricating the three dimensional model on the layer by layer basis according to claim 1, wherein the system further comprises:
    a removal device for removing a desired thickness of the mold material and the model material to reduce the layer to a selected thickness of the mold material and the model material.

6. The system for fabricating the three dimensional model on the layer by layer basis according to claim 1, further comprising:
    a vertically positionable workpiece platform for supporting a composite model of the three dimensional model, the composite model comprising mold material and model material, and
    a two axis horizontally positionable carriage supporting the drop-on-demand device and the high deposition rate device,
        the vertically positionable workpiece platform and the two axis horizontally positionable carriage allowing the drop-on-demand device and the high deposition rate device to be vertically and horizontally positioned with respect to the composite model for the deposition of the mold material and the model material,
    a mold material supply including a mold material reservoir, a mold material conduit coupling the mold material reservoir to the drop-on-demand device and a drop-on-demand device controller, and
    a model material supply including a model material reservoir, a model material conduit coupling the model material reservoir to the high deposition rate device and a high deposition rate device controller.

7. The system for fabricating the three dimensional model on the layer by layer basis according to claim 6, further comprising a horizontally positionable removal device for removing a desired thickness of deposited mold material and model material to reduce a layer to a selected thickness of the deposited mold material and the model material.

8. The system for fabricating the three dimensional model on the layer by layer basis according to claim 1, wherein the cross sectional area of the air flow path, in the region of the air outlet, and a cross sectional area of the material flow path, in the region of the model material outlet, are configured to spray the model material in a desired spray pattern.

9. The system for fabricating the three dimensional model on the layer by layer basis according to claim 1, wherein the high deposition rate device uses the flow of air across the model material outlet to atomize the model material.

10. The system for fabricating the three dimensional model on the layer by layer basis according to claim 1, wherein the high deposition rate device uses pressure to deliver model material from the model material reservoir to the high deposition rate device.

11. The system for fabricating the three dimensional model on the layer by layer basis according to claim 1, wherein the high deposition rate device contains an adjustable valve to restrict the flow of model material through the high deposition rate device.

12. The system for fabricating the three dimensional model on the layer by layer basis according to claim 10, wherein the cross sectional area of the air flow path in the region of the air outlet and a cross sectional area of the material flow path in the region of the model material outlet are of circular cross section to form a conical nozzle.

13. A system for fabricating a three dimensional model formed of a plurality of successive layers including model material forming the three dimensional model and sacrificial mold material forming a sacrificial mold for the model material, the system comprising:
- a drop-on-demand device for depositing, via drop-by-drop deposition, at least one line of sacrificial mold material delineating at least one boundary of the model material within a layer;
- a high deposition rate device for depositing the model material, by spray deposition, at least onto regions of the layer delineated by the at least one boundary of the model material; and
- a removal device for removing a desired thickness of the sacrificial mold material and the model material to reduce the deposited layer to a selected thickness of the sacrificial mold material and the model material,
- wherein the high deposition rate device comprises
- a spray device body having a model material path and an air flow path terminating in a nozzle for dispensing the model material a high flow rate,
  - the model material path includes
    - a model material inlet connectable solely to a model material supply,
    - a model material flow restrictor for controlling a flow of model material through the model material passage,
    - a model material passage, and
    - a model material outlet connected from an output end of the model material passage,
    - a model material passage temperature sensor for sensing a temperature of the model material in the model material flow passage, and
    - a model material passage heating element, responsive to the model material temperature sensor, for controlling the temperature of the model material in the model material flow passage,
  - the air flow path includes
    - an air inlet connectable solely to an air supply,
    - an air channel formed between the model material supply tube and the spray device body,
    - an air outlet,
    - an air flow path temperature sensor for sensing a temperature of an air flow in the air flow path, and
    - an air flow path thermal control element, responsive to the air flow path temperature sensor, for controlling the temperature of the air flow in the air flow path,
  - a cross sectional area of the air flow path is reduced, in a region of the air outlet, to cause an increase in speed of an air flow and a decrease of an air pressure in the region of the air outlet thereby to draw model material from the model material outlet and dispense a spray of model material from the nozzle.

14. The system for fabricating the three dimensional model according to claim 13, wherein the system further includes:
- a separation process for effecting removing only the sacrificial mold material and freeing the three dimensional model from the sacrificial mold material.

15. The system for fabricating the three dimensional model according to claim 13 in which a void is included in the model, wherein:
- in each layer having a region included in the void, the drop-on-demand device deposits lines of sacrificial mold material in a grid pattern delineating the region of the layer included in the void, whereby grid patterns in successive layers having regions included in the void forming partitions of sacrificial mold material that form filler spaces for receiving the model material deposited by the high deposition rate device to form filler elements of model material separated by the sacrificial mold material partitions occupying the void.

16. The system for fabricating a three dimensional model according to claim 15, wherein the system further includes:
- a process affecting only the sacrificial mold material for removing the sacrificial mold material to thereby release the filler elements of the model material from the three dimensional model to thereby form at least one void in the three dimensional model.

17. A high deposition rate device for depositing a model material, comprising:
- a high deposition rate device body having a model material path and an air flow path in a cylindrical inner space terminating in a nozzle for dispensing a model material at a high flow rate,
  - the model material path including
    - a model material inlet connectable solely to a model material supply,
    - a model material flow restrictor for controlling a flow of model material through the model material path,
    - a model material passage, and
    - a model material outlet connected from an output end of the model material passage,
    - a model material path temperature sensor for sensing a temperature of the model material in the model material flow path, and
    - a model material path heating element, responsive to the model material temperature sensor, for controlling the temperature of the model material in the model material flow path,
  - the air flow path including
    - an air inlet connectable solely to an air supply,
    - an air channel formed between the model material supply tube and the spray device body,
    - an air outlet,
    - an air flow path temperature sensor for sensing a temperature of an air flow in the air flow path, and
    - an air flow path thermal control element, responsive to the air flow path temperature sensor, for controlling the temperature of the air flow in the air flow path, and
- a cross sectional area of the air flow path is reduced, in a region of the air outlet, to cause an increase in speed of an air flow and a decrease of an air pressure in the region of the air outlet to thereby draw model material from the model material outlet and dispense a spray of model material from the nozzle.

18. The high deposition rate device of claim 17, wherein the cross sectional area of the air flow path, in the region of the air outlet, and a cross sectional area of the material flow path, in the region of the model material outlet, are configured to spray the model material in a desired spray pattern.

19. The high deposition rate device of claim 17, wherein the cross sectional area of the air flow path, in the region of the air outlet, and a cross sectional area of the material flow path, in the region of the model material outlet, are of circular cross section to form a conical nozzle.

* * * * *